US006492064B1

(12) United States Patent
Smart et al.

(10) Patent No.: US 6,492,064 B1
(45) Date of Patent: Dec. 10, 2002

(54) ORGANIC SOLVENTS, ELECTROLYTES, AND LITHIUM ION CELLS WITH GOOD LOW TEMPERATURE PERFORMANCE

(75) Inventors: Marshall C. Smart, Studio City, CA (US); Ratnakumar V. Bugga, Arcadia, CA (US); Subbarao Surampudi, Glendora, CA (US); Chen-Kuo Huang, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/304,241

(22) Filed: May 3, 1999

Related U.S. Application Data

(60) Provisional application No. 60/088,125, filed on Jun. 4, 1998.

(51) Int. Cl.[7] .................................................. H01M 6/16
(52) U.S. Cl. ........................ 429/330; 429/332; 429/334; 429/199; 252/62.2
(58) Field of Search ................................. 429/330, 332, 429/334, 199; 252/62.2

(56) References Cited

U.S. PATENT DOCUMENTS

| | | | |
|---|---|---|---|
| 4,104,450 A | 8/1978 | Whitney et al. | 429/194 |
| 4,247,604 A | 1/1981 | Marianowski et al. | 429/40 |
| 4,252,876 A | 2/1981 | Koch | 429/197 |
| 4,579,796 A | 4/1986 | Muramatsu | 429/198 |
| 4,853,304 A | 8/1989 | Ebner et al. | 429/192 |
| 5,030,528 A | 7/1991 | Shen et al. | 429/197 |
| 5,085,954 A | 2/1992 | Kita et al. | 429/194 |
| 5,206,095 A | 4/1993 | Donado et al. | 429/16 |
| 5,356,736 A | 10/1994 | Kita et al. | 429/197 |
| 5,433,876 A | 7/1995 | Fauteux et al. | 252/62.2 |
| 5,443,601 A | 8/1995 | Doeff et al. | 29/623.5 |
| 5,453,335 A | 9/1995 | Fauteux et al. | 429/192 |
| 5,478,674 A | 12/1995 | Miyasaka | 429/218 |
| 5,484,670 A | 1/1996 | Angell et al. | 429/199 |

(List continued on next page.)

FOREIGN PATENT DOCUMENTS

| | | | |
|---|---|---|---|
| JP | 8-162153 | * | 6/1996 |
| JP | 9-63645 | * | 3/1997 |
| JP | WO 98/57386 | * | 12/1998 |

OTHER PUBLICATIONS

Yeager, E.B., et al., "Lithium Nonaqueous Battery Electrochemistry", The Electrochemical Society, Inc., Jun. 1980, Proceedings vol. 80–7, pp. 35–45.

(List continued on next page.)

*Primary Examiner*—Laura Weiner
(74) *Attorney, Agent, or Firm*—Christie, Parker & Hale, LLP

(57) ABSTRACT

Multi-component organic solvent systems, electrolytes and electrochemical cells characterized by good low temperature performance are provided. In one embodiment, an improved organic solvent system contains a ternary mixture of ethylene carbonate, dimethyl carbonate and diethyl carbonate. In other embodiments, quaternary systems include a fourth component, i.e, an aliphatic ester, an asymmetric alkyl carbonate or a compound of the formula LiOX, where X is R, COOR, or COR, where R is alkyl or fluoroalkyl. Electrolytes based on such organic solvent systems are also provided and contain therein a lithium salt of high ionic mobility, such as $LiPF_6$. Reversible electrochemical cells, particularly lithium ion cells, are constructed with the improved electrolytes, and preferably include a carbonaceous anode, an insertion type cathode, and an electrolyte interspersed therebetween.

10 Claims, 18 Drawing Sheets

Comparison of the discharge capacities of AA-size lithium-ion cells at −20°C as a function of electrolyte.

U.S. PATENT DOCUMENTS

| | | | | |
|---|---|---|---|---|
| 5,558,954 A | | 9/1996 | Morrison | 429/218 |
| 5,597,663 A | | 1/1997 | Pendalwar et al. | 429/198 |
| 5,624,606 A | | 4/1997 | Wilson et al. | 252/506 |
| 5,650,245 A | | 7/1997 | Zhong et al. | 429/196 |
| 5,707,760 A | | 1/1998 | Stux et al. | 429/188 |
| 5,731,104 A | | 3/1998 | Ventura et al. | 429/188 |
| 5,750,284 A | | 5/1998 | Pendalwar et al. | 429/197 |
| 5,776,635 A | | 7/1998 | Gan et al. | 429/197 |
| 5,783,333 A | * | 7/1998 | Mayer | 429/223 |
| 5,824,434 A | | 10/1998 | Kawakami et al. | 429/209 |
| 5,827,602 A | | 10/1998 | Koch et al. | 429/194 |
| 5,851,696 A | | 12/1998 | Saidi et al. | 429/218 |
| 5,858,324 A | | 1/1999 | Dahn et al. | 423/596 |
| 5,989,747 A | * | 11/1999 | Tanaka et al. | 429/209 |
| 6,027,835 A | * | 2/2000 | Fukumura et al. | 429/233 |
| 6,057,062 A | * | 5/2000 | Gan et al. | 429/342 |
| 6,090,506 A | * | 7/2000 | Inoue et al. | 429/137 |
| 6,153,338 A | * | 11/2000 | Gan et al. | 252/62.2 |

OTHER PUBLICATIONS

Internet Article of eesa, Dudley, G., et al., "Secondary Lithium Batteries for Spacecraft", Power and Energy Conversion Division, Energy Storage Section, ESTEC, Noordwijk, The Netherlands, pp. 1–5 and 3 sheets of figures.

Arakawa, Masayasu, et al., "The Cathodic Decomposition of Propylene Carbonate in Lithium Batteries", J. Electroanal. Chem., 219 (1987) pp. 273–280.

Shu, Z.X., et al., "Effect of 12 Crown 4 on the Electrochemical Intercalation of Lithium into Graphite", J. Electrochem. Soc., vol. 140, No. 6, Jun. 1993, pp. L101–L103.

Chusid, O. (Youngman), et al., "Electrochemical and Spectroscopic Studies of Carbon Electrodes in Lithium Battery Electrolyte Systems", Journal of Power Sources, 43–44 (1993) pp. 47–64.

Aurbach, Doron, et al. "The Correlation Between the Surface Chemistry and the Performance of Li–Carbon Intercalation Anodes for Rechargeable "Rocking–Chair" Type Batteries", J. Electrochem. Soc., vol. 141, No. 3, Mar. 1994, pp. 603–611.

Zheng, Tao, et al., "Lithium Insertion in High Capacity Carbonaceous Materials", J. Electrochem. Soc., vol. 142, No. 8, Aug. 1995, pp. 2581–2590.

Matsumura, Y., et al., "Mechanism Leading to Irreversible Capacity Loss in Li Ion Rechargeable Batteries", J. Electrochem. Soc., vol. 142, No. 9, Sep. 1995, pp. 2914–2918.

Berhil, M., et al., Reactivity and Cycling Behavior of Lithium in Propylene Carbonate–Ethylene Carbonate–Dimethyl Carbonate Mixtures, Journal of Power Sources 55 (1995) pp. 205–210.

Izutsu, Kosuke, et al., "Potentiometric Study of Complexation and Solvation of Lithium Ions in Some Solvents Related to Lithium Batteries", Electrochimica Acta, vol. 41, No. 16, 1996, pp. 2523–2527.

Tobishima, S., et al. "Ethylene Carbonate–Based Electrolytes for Rechargeable Lithium Batteries", Journal of Power Sources, 26 (1989) pp. 449–454.

Ohta, Akira, et al., "Relationship Between Carbonaceous Materials and Electrolyte in Secondary Lithium–Ion Batteries", Journal of Power Sources, 54 (1995) pp. 6–10.

Sasaki, Yukio, et al., "Lithium Cycling Efficiency of Ternary Solvent Electrolytes with Ethylene Carbonate–Dimethyl Carbonate Mixture", Journal of Power Sources 68 (1997) pp. 492–496.

"Development of Electrolytes for Low Temperature Rechargeable Lithium–ion Cells"; M.C. Smart, et al.; Jet Propulsion Laboratory, California Institute of Technology; $37^{th}$ Power Sources Conference; Jun. 1996;; pp. 239–242.

"Development of Advanced Lithium–Ion Rechargeable Cells with Improved Low Temperature Performance"; M.C. Smart, et al., Jet Propulsion Laboratory, California Institute of Technology; $32^{nd}$ IECEC; Jul. 27th–Aug. 1st 1997; pp. 52–57.

"Electrolytes for Low–Temperature Lithium Batteries Based on Ternary Mixtures of Aliphatic Carbonates"; M.C. Smart, et al.; Jet Propulsion Laboratory, California Institute of Technology; Reprint From The Journal of Electrochemical Society; vol. 146, No. 2, ©Feb. 1999; pp. 486–492.

"Performance Characteristics of Lithium Ion Cells for Low Temperature Applications"; M.C. Smart, et al.; Jet Propulsion Laboratory, California Institute of Technology; Electrochemical Society Meeting; May 3rd–8th 1998; vol. 98–1, Abstract No. 53; (two sheets).

"Electrolytes for Low Temperature Lithium–Ion Cells"; M.C. Smart, et al.; Jet Propulsion Laboratory, California Institute of Technology; SAE Aerospace Power Systems Conference; Apr. 1998; pp. 7–14.

"Development of High Conductivity Lithium–ion Electrolytes for Low Temperature Cell Applications"; M.C. Smart, et al.; Jet Propulsion Laboratory, California Institute of Technology; Proceedings of the $38^{th}$ Power Sources Conference; Jun. 8th–11th 1998; pp. 452–456.

"The Role of Electrolyte Upon the SEI Formation Characteristics and Low Temperature Peformance of Lithium–Ion Cells with Graphite Anodes"; M.C. Smart et al.; Jet Propulsion Laboratory, California Institute of Technology; Meeting Abstract $194^{th}$ Electrochemical Society Meeting; Nov. 1st–6th 1998; (two sheets).

The Role of Electrolyte Upon the SEI Formation Characteristics and Low Temperature Performance of Lithium–Ion Cells with Graphite Anodes; M.C. Smart et al.; Jet Propulsion Laboratory, California Institute of Technology; (seven sheets) No Date.

"Electrolytes for Li–Ion Cells in Low Temperature Applications"; M.C. Smart et al., Jet Propulsion Laboratory, California Institute of Technology; IEEE $14^{th}$ Annual Battery Conference on Applications and Advances; Jan. $12^{th}$–$15^{th}$ 1999; ©1999 IEEE; pp. 55–60.

Informal Search: List of papers; (16 sheets).

Informal Search: "Alkoxide Search" Listing Five U.S. Patents w/Abstracts; (4 sheets).

Informal Search: Listing Multiple U.S. Patents (5 sheets).

Informal Search: Abstract and Claims of U.S. No. 5,437,945 "Secondary Battery Having Non–Aqueous Electrolyte"; Omaru et al.; issued Aug. 1995; (two sheets).

* cited by examiner

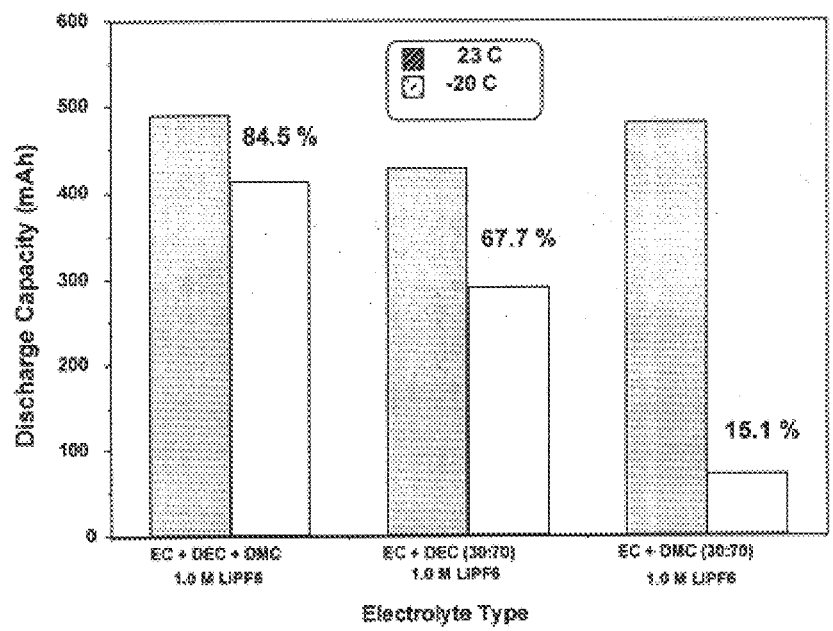
FIG. 2. Comparison of the discharge capacities of graphite-based AA-size lithium-ion cells with different electrolytes as a function of temperature.
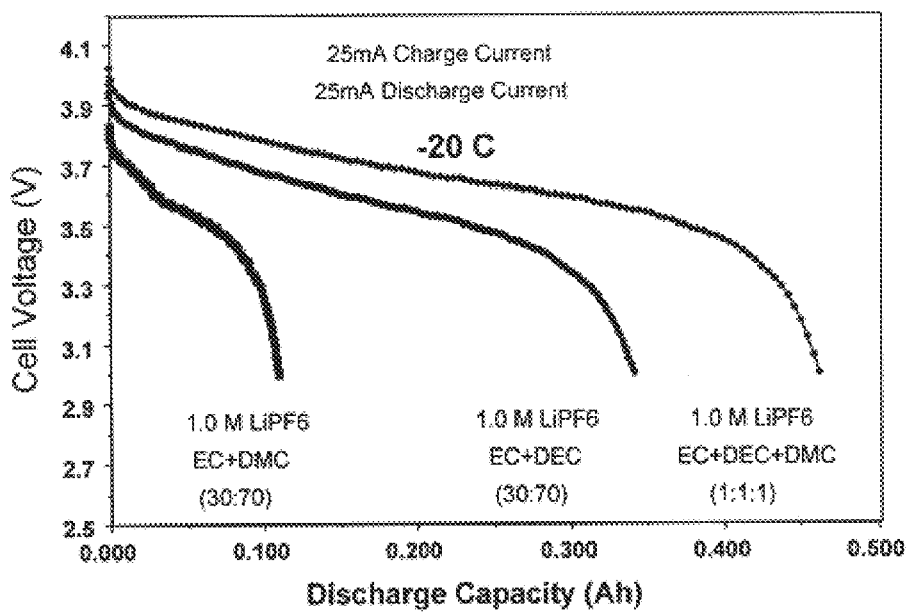
FIG. 3. Comparison of the discharge capacities of AA-size lithium-ion cells at -20°C as a function of electrolyte.

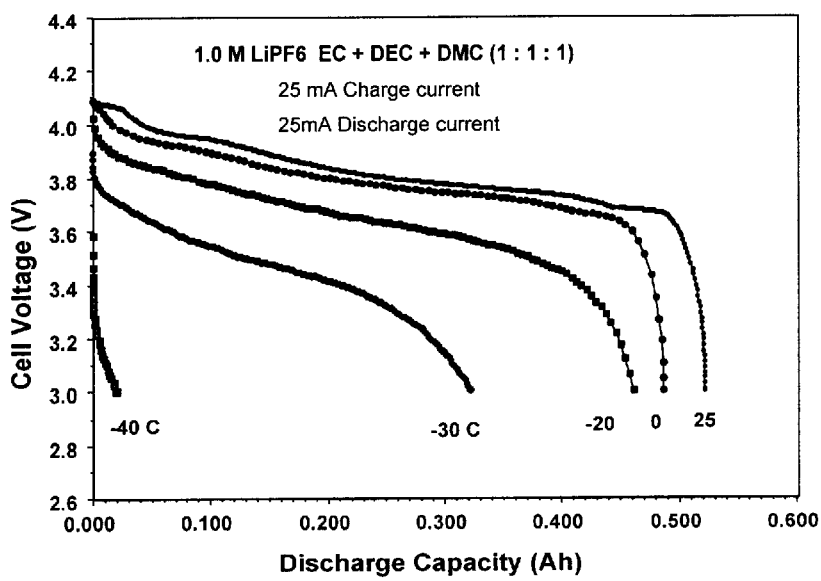
FIG. 4. Discharge capacity of a AA lithium-ion cell containing 1.0 M $LiPF_6$ EC + DMC + DEC (1:1:1) electrolyte as a function of temperature.
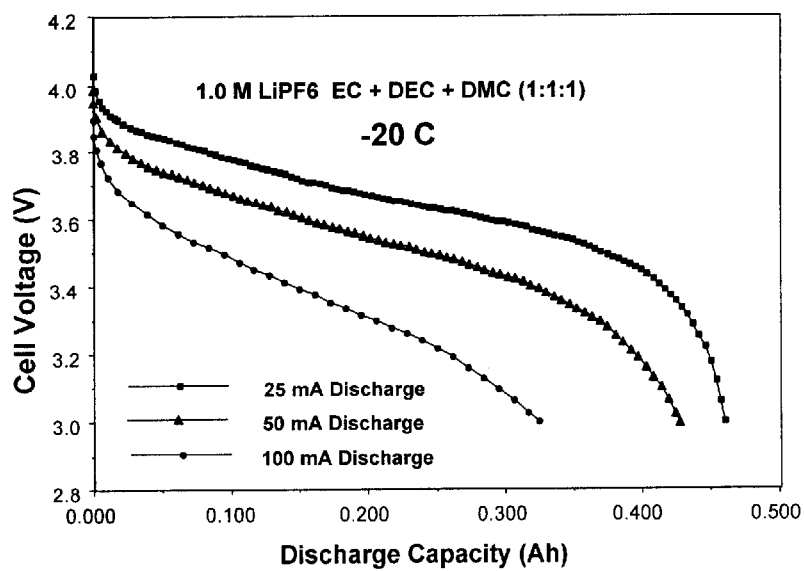
FIG. 5 Rate capability of a AA-size lithium-ion cell at -20°C containing 1.0 M $LiPF_6$ EC + DMC + DEC (1:1:1) electrolyte. Cell was charged at -20°C at a rate of 25mA (~C/20) to 4.1V and discharged at -20° at various rates to 3.0V.

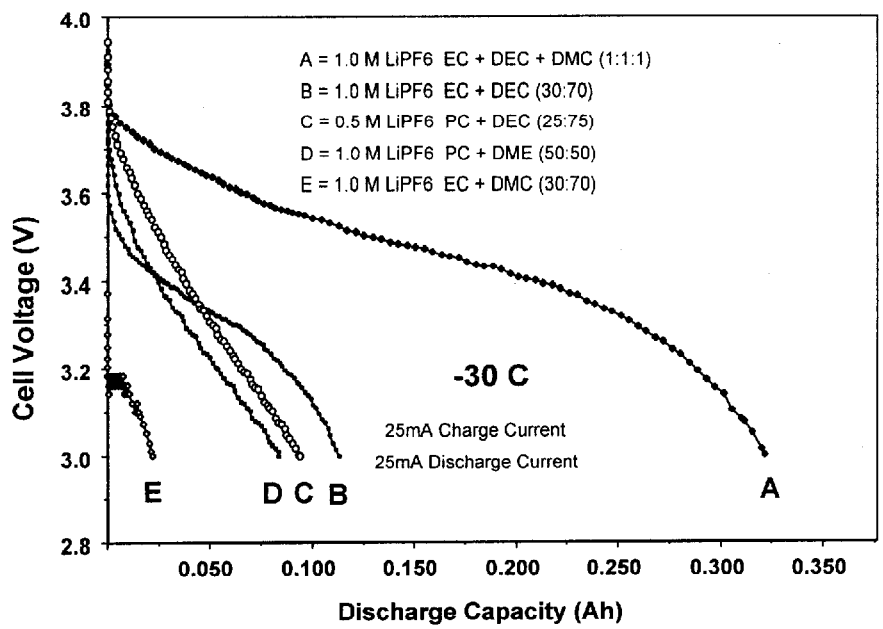
FIG. 6 Comparison of the discharge capacity of lithium-ion cells with EC and PC based electrolytes at -30°C.
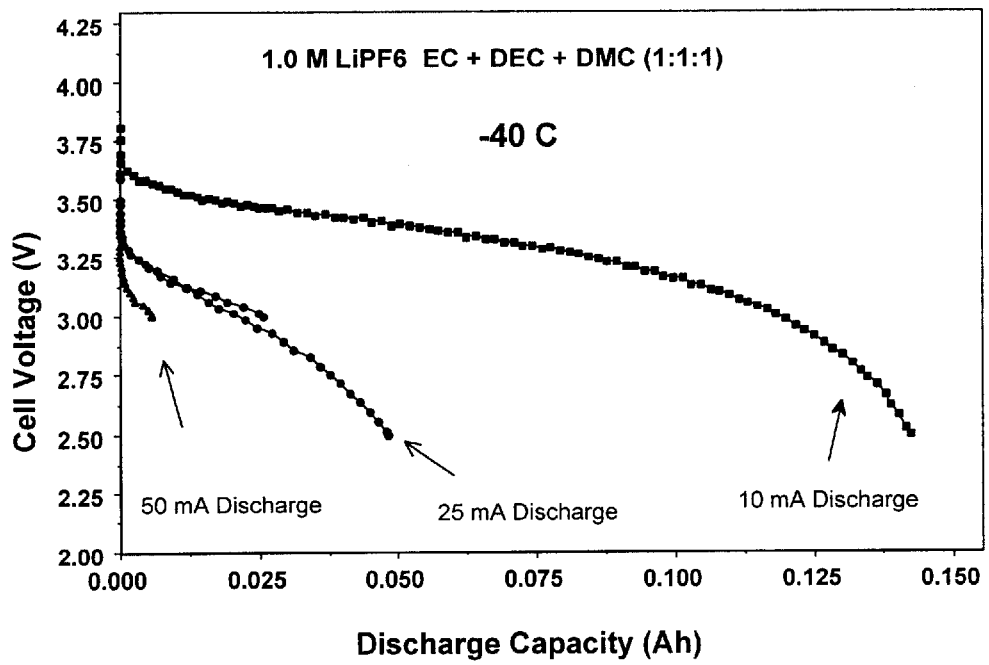
FIG. 7 Performance of a AA-size lithium-Ion cells containing 1.0M $LiPF_6$ EC+DEC+DMC (1:1:1) at low temperature (-40°C).

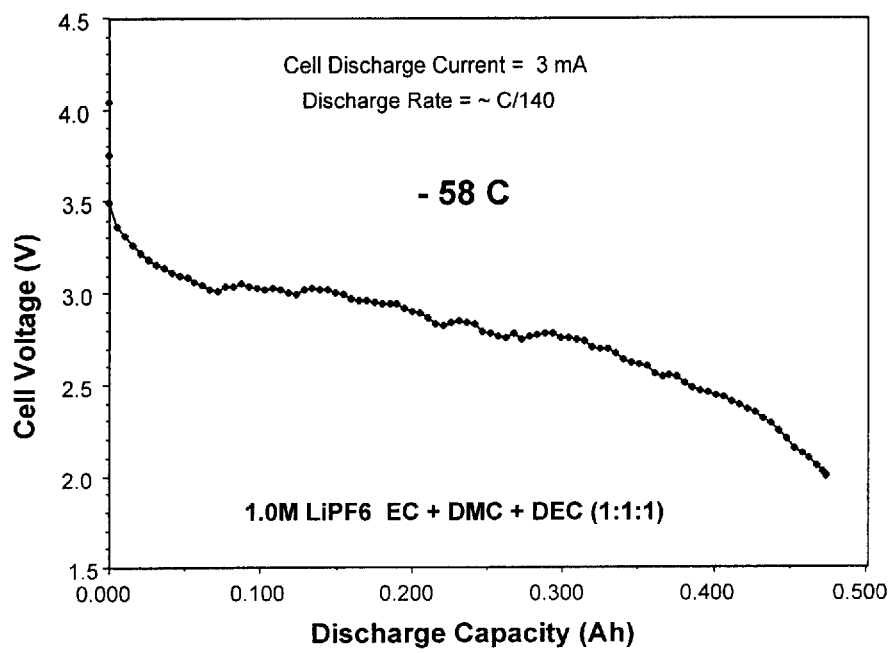
FIG. 8 Discharge capacity of AA-size lithium cell containing 1.0 M $LiPF_6$ EC + DMC + DEC (1:1:1) electrolyte at -58°C using a discharge current of 3mA.
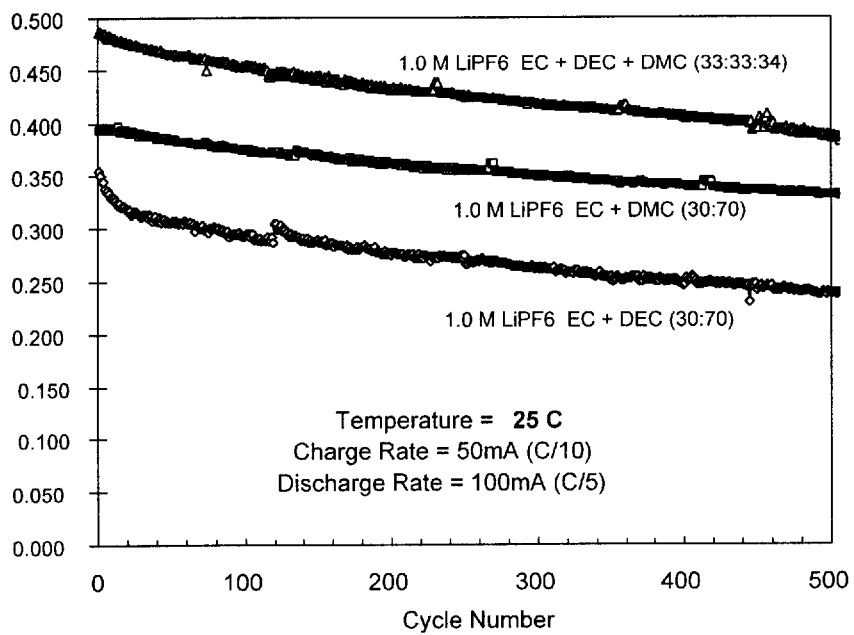
Fig. 9 Room temperature cycle life performance of graphite-based AA size Li-ion cells. Cells were charged at rate of 50mA (~C/10) and discharged at a rate of 100mA (~C/5).

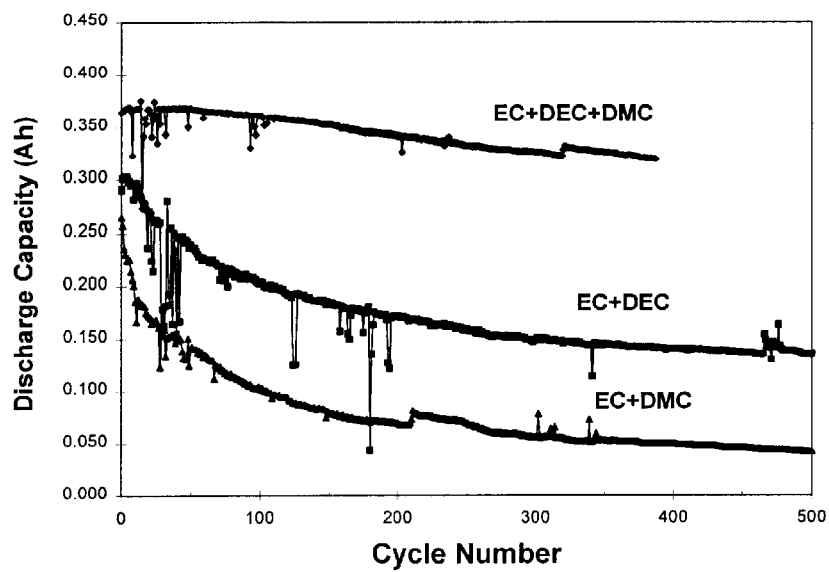
Fig. 10. Low temperature cycle life performance (at -20°C) of lithium-ion cells containing EC-based electrolytes. Cells were charged at rate of 25mA (~C/20) and discharged at a rate of 50mA (~C/10).
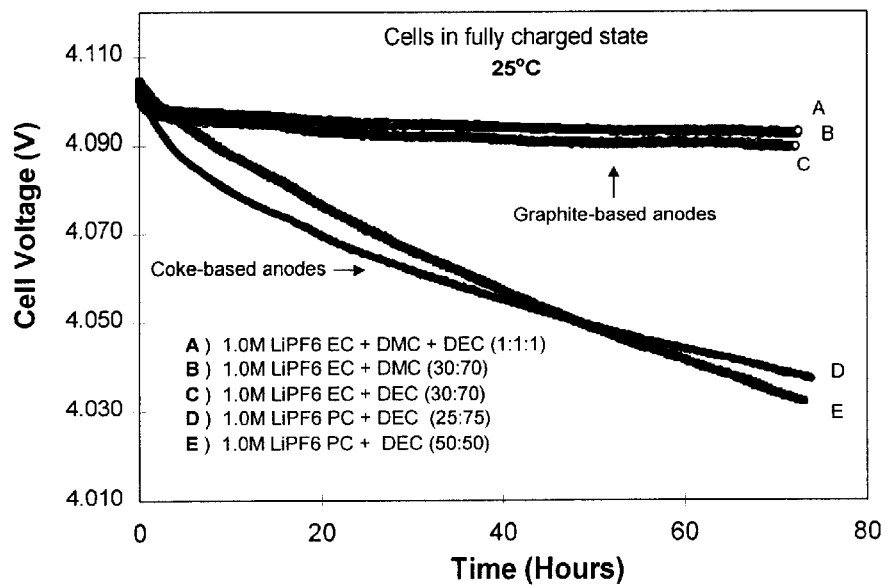
Fig. 11. Self discharge characteristics of lithium ion cells. The cell voltage was monitored as a function of time at room temperature under OCV conditions.

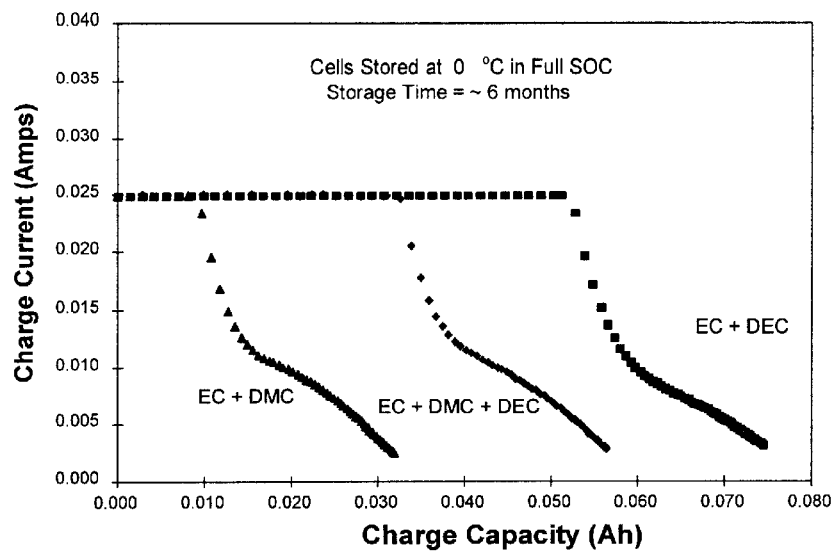
Fig. 12. Self-discharge characterization of lithium-ion cells: charge acceptance after prolonged storage.
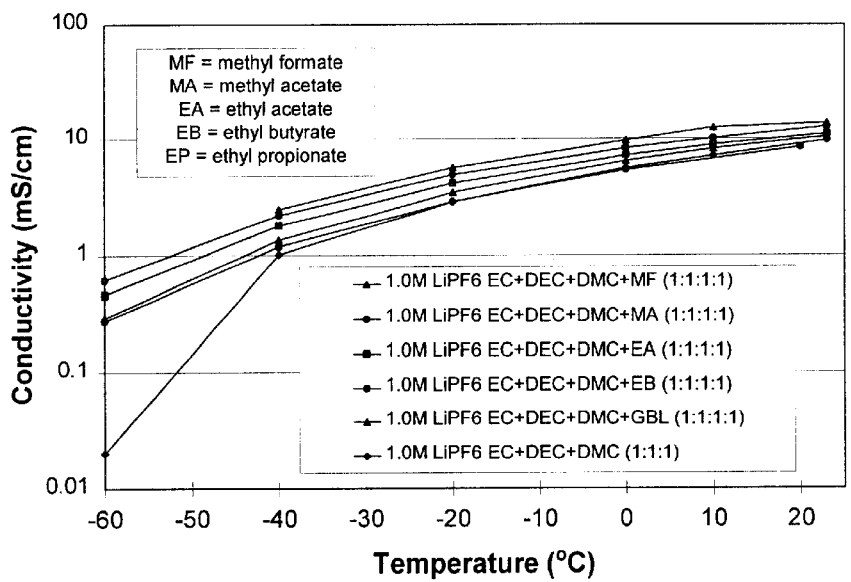
Fig. 13. Conductivity of various lithium-ion battery electrolytes, based on ternary solvent mixtures of EC, DEC and DMC, and aliphatic ester co-solvents.

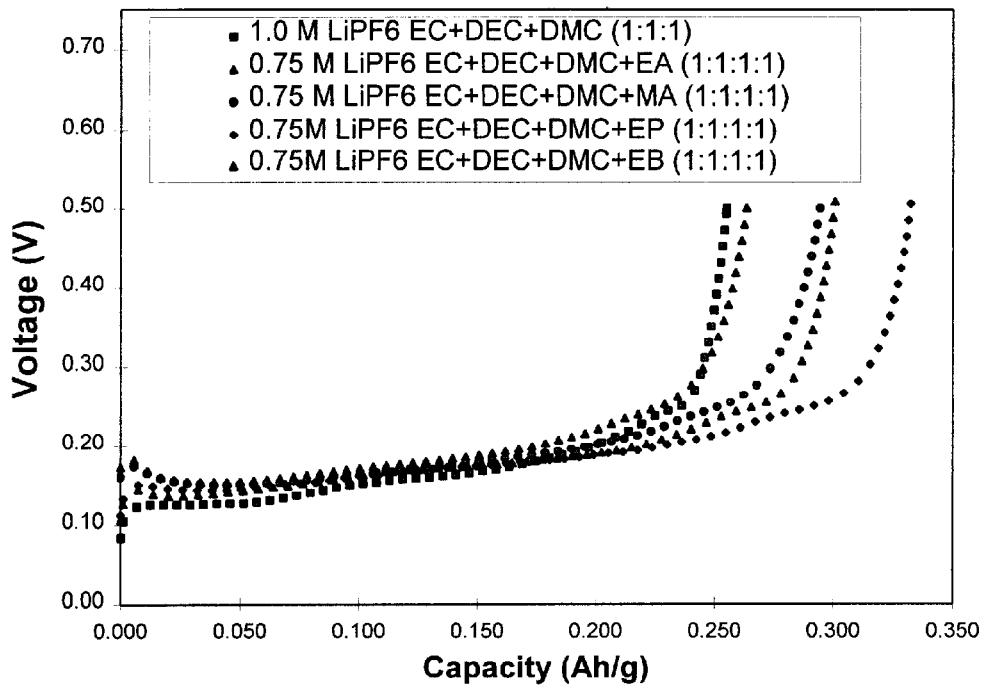
Fig. 14. Discharge curves at 25°C of graphite anode in contact with 0.75 M LiPF$_6$ dissolved in EC:DEC:DMC (1:1:1), with different ester co-solvents.
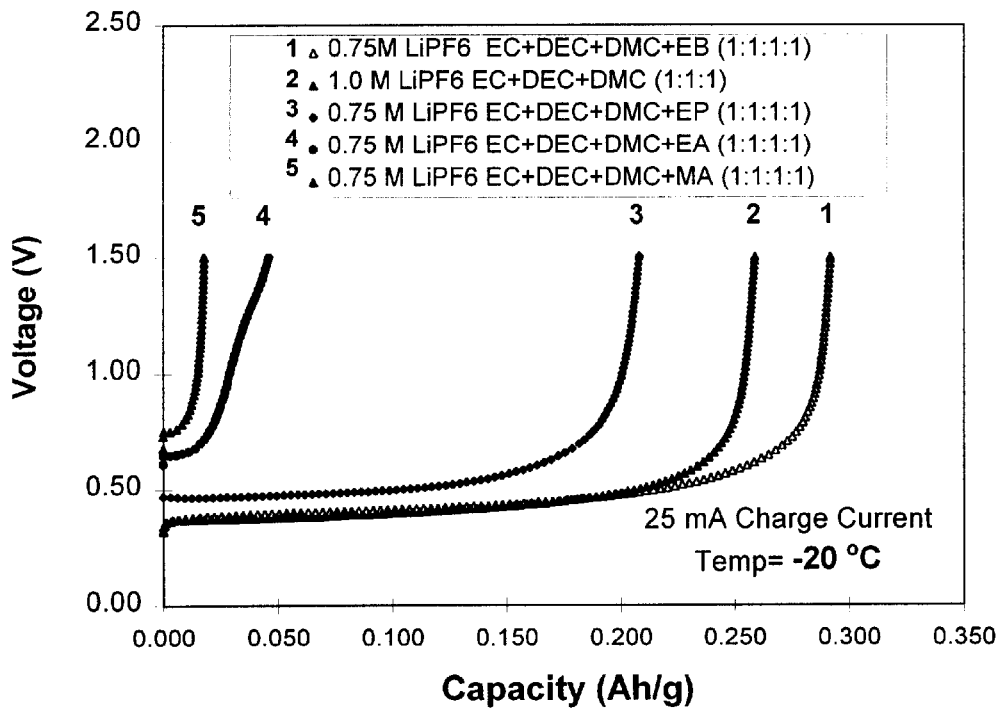
Fig. 15. Discharge curves at -20°C of graphite anode in contact with 0.75 M LiPF$_6$ dissolved in EC:DEC:DMC (1:1:1), with different ester co-solvents.

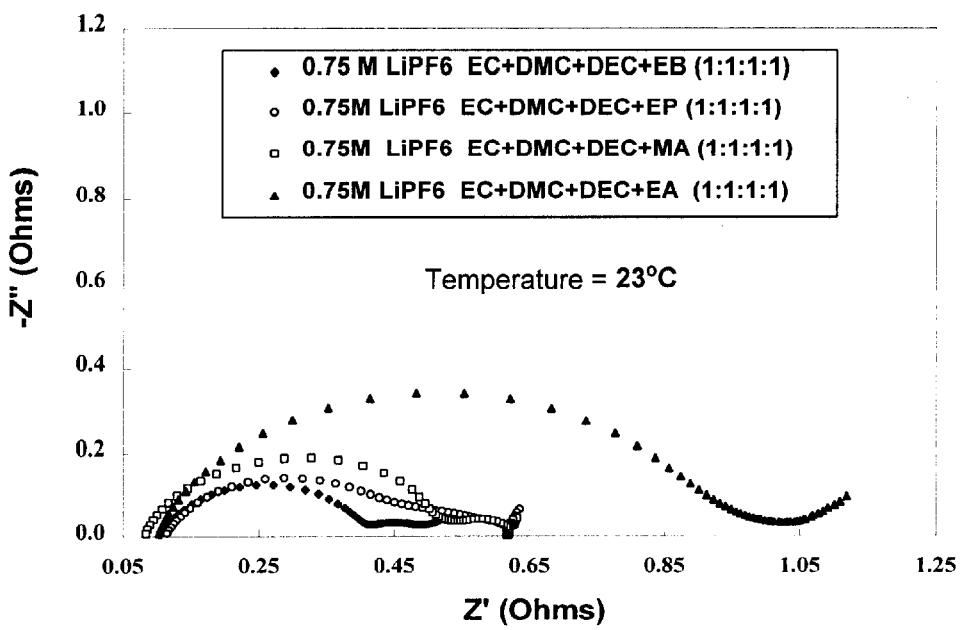
Fig. 16. AC Impedance plots at 25°C of graphite anode in contact with 0.75 M LiPF$_6$ dissolved in EC:DEC:DMC (1:1:1), with different ester co-solvents.
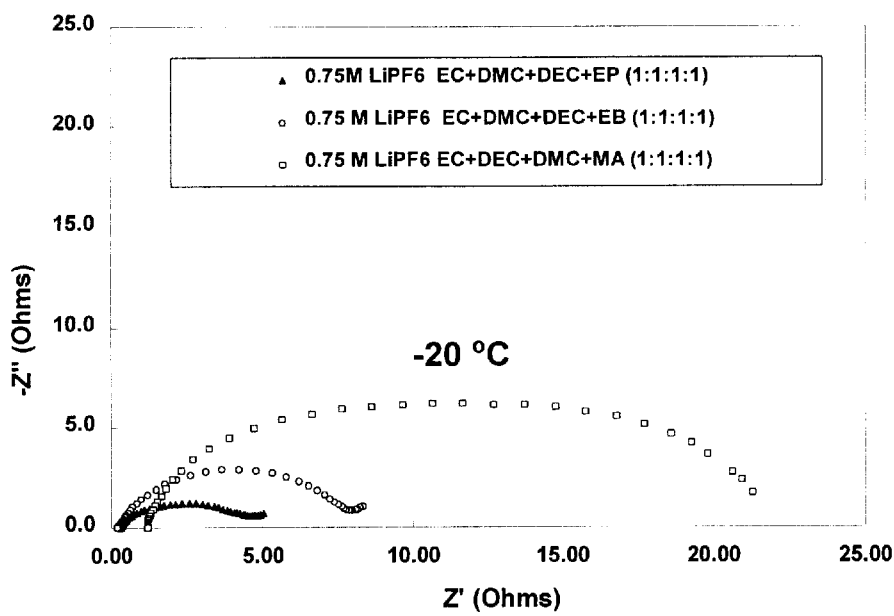
Fig. 17. AC Impedance plots at 25°C of graphite anode in contact with 0.75 M LiPF$_6$ dissolved in EC:DEC:DMC (1:1:1), with different ester co-solvents.

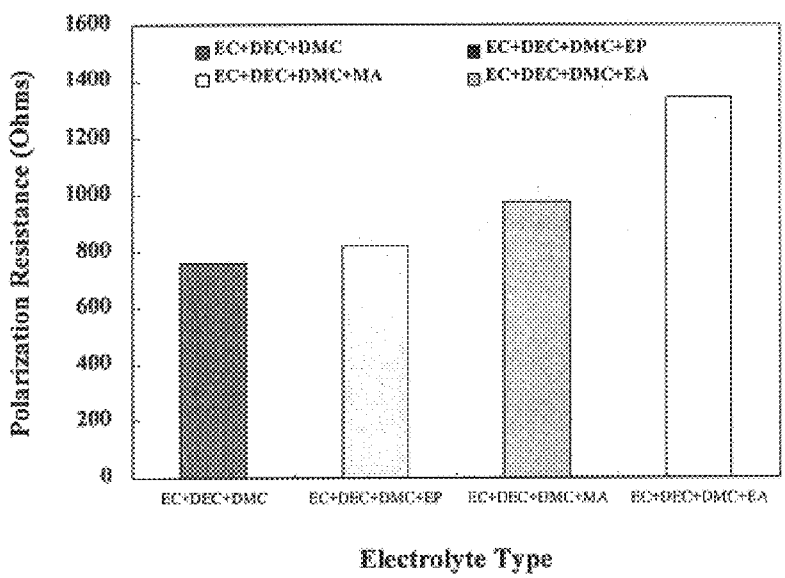
Fig. 18. Polarization resistance of graphite electrodes at 25°C in contact with 0.75 M LiPF$_6$ dissolved in EC:DEC:DMC (1:1:1), with different ester co-solvents.
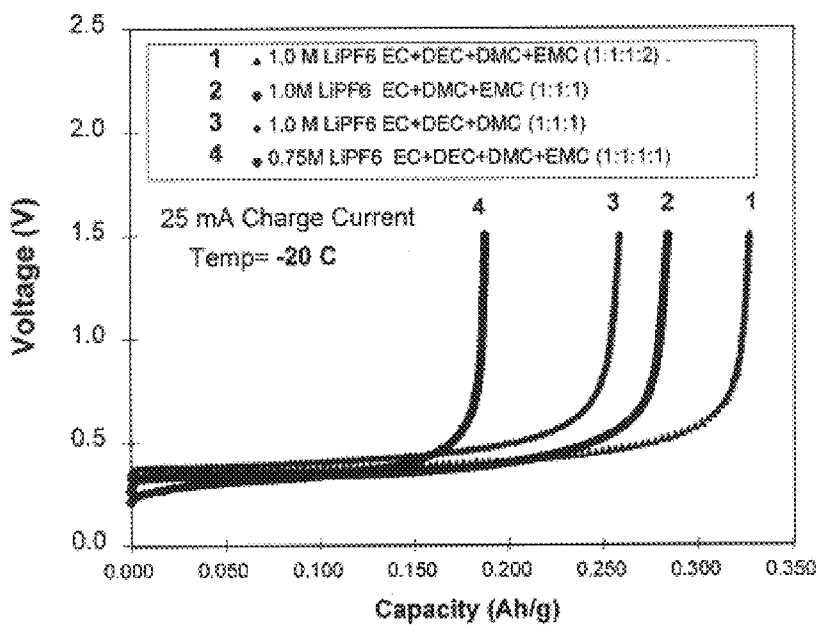
Fig. 19 Discharge curves of graphite electrodes in contact with different electrolytes at low temperature (-20°C).

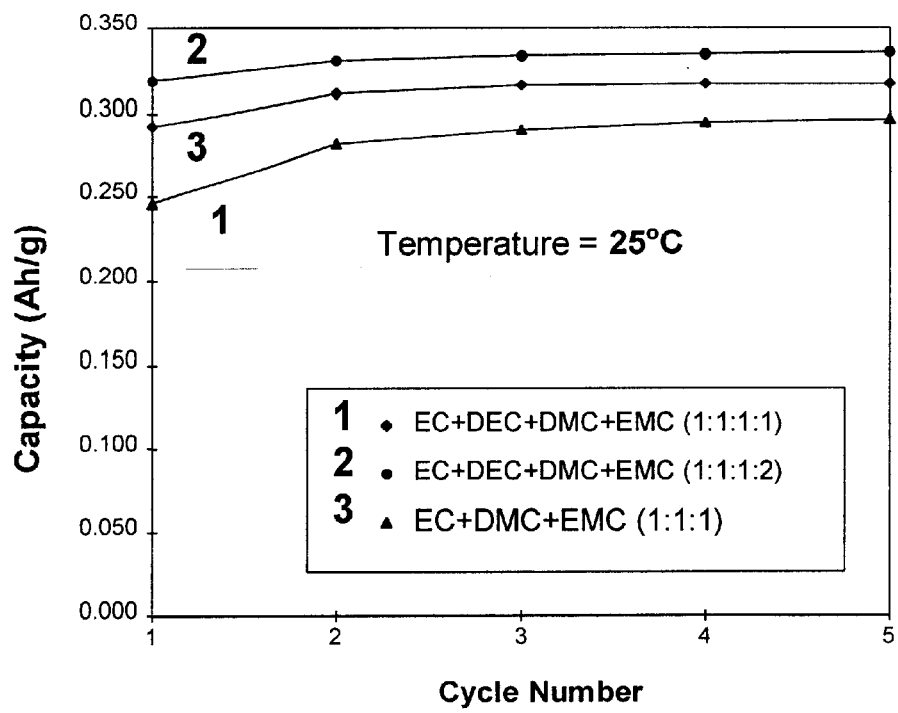
Fig. 20 Discharge capacity of graphite electrodes in Li-carbon cells with various EC-based electrolytes during formation cycles.
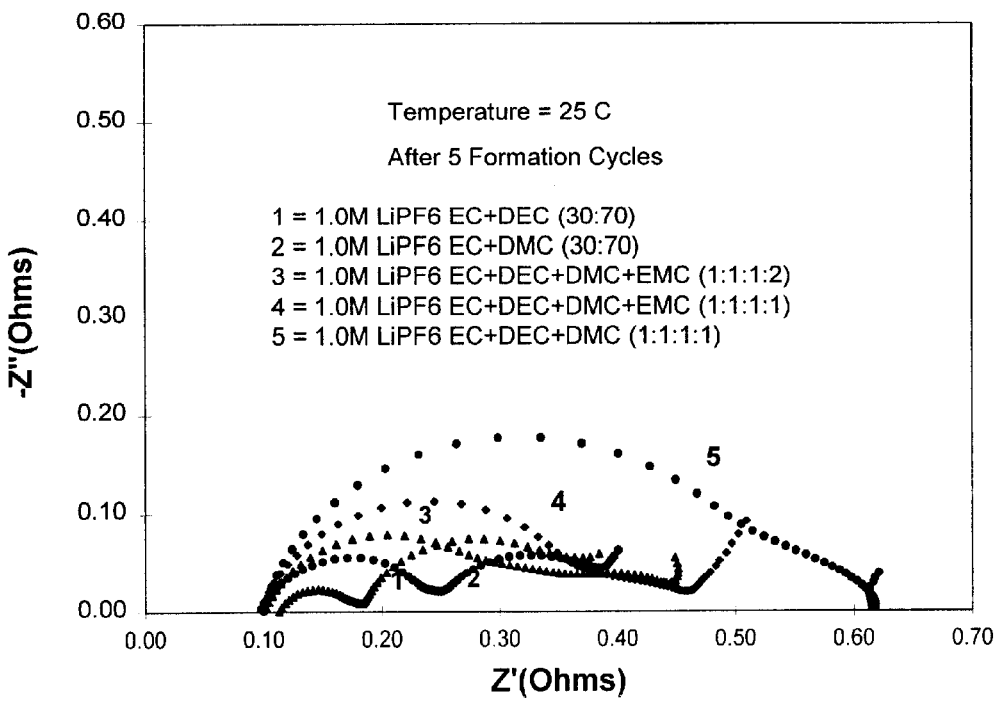
FIG. 21 AC impedance (Nyquist) plots of lithium-graphite cells possessing various electrolytes at room temperature.

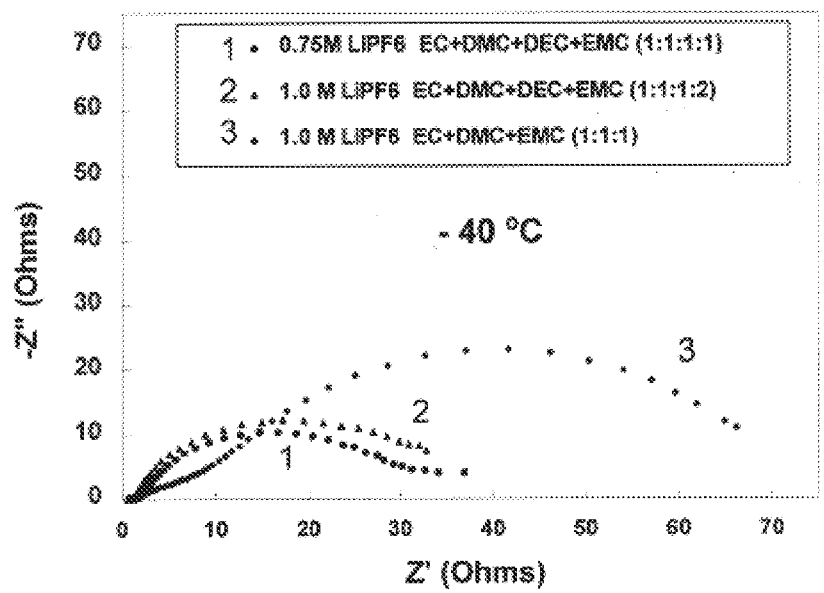
Fig. 22 AC impedance (Nyquist) plots of lithium-graphite cells possessing various electrolytes at low temperature (-40°C).
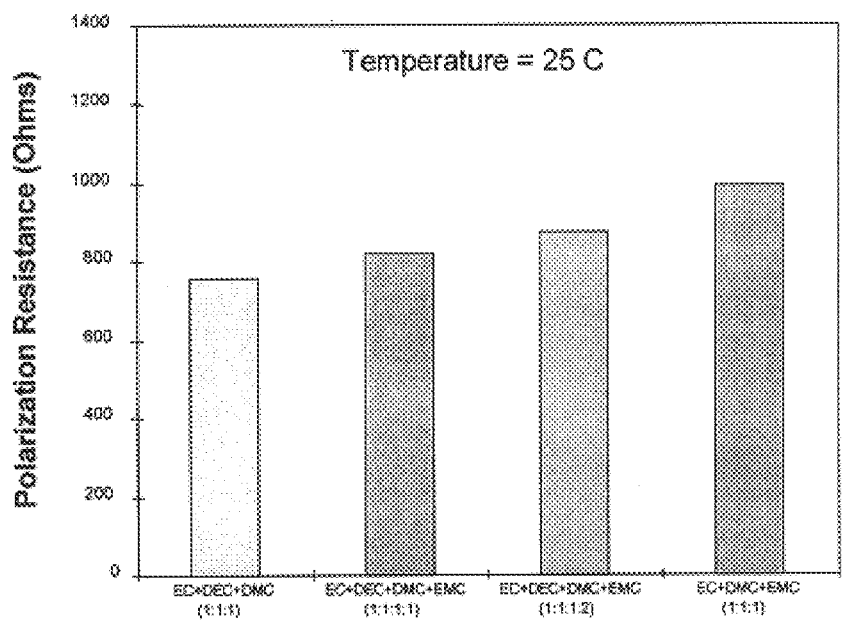
Fig. 23 Linear polarization resistance of graphite electrodes with different electrolytes at room temperatures

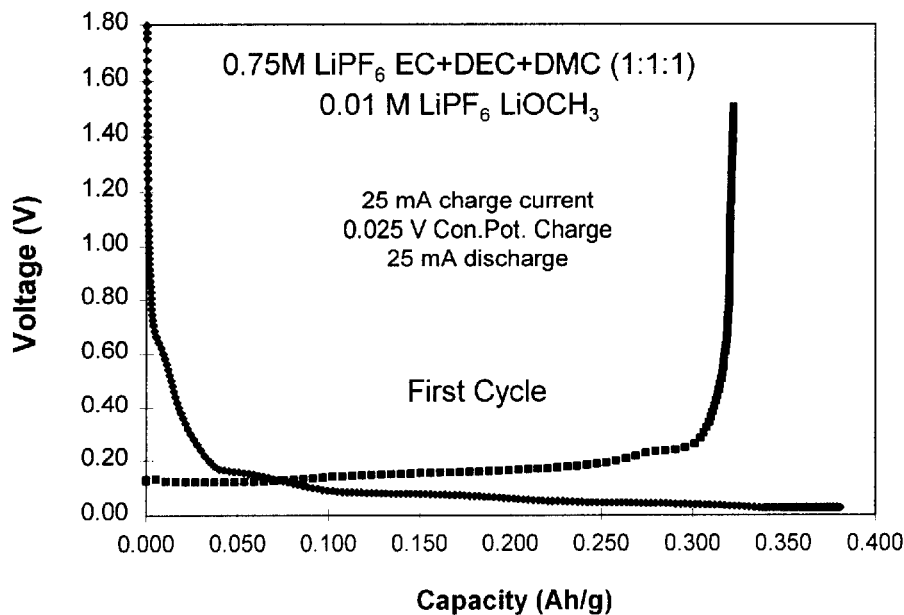
Fig. 24 First lithium intercalation/de-intercalation cycle of lithium-graphite cells possessing 1.0 M LiPF6 EC+DEC+DMC (1:1:1 vol%) + 0.01 M LiOCH$_3$ electrolyte.
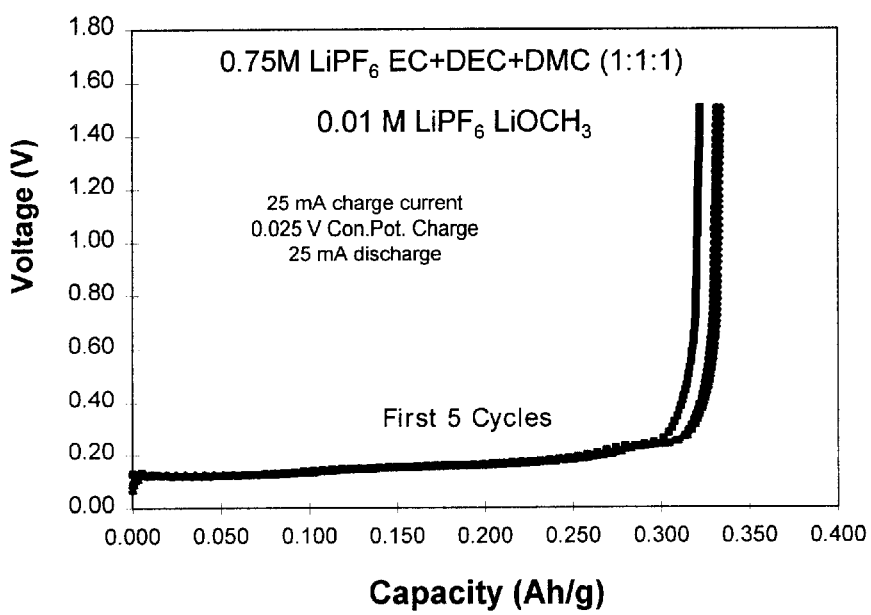
Fig. 25 First five lithium de-intercalation cycles of lithium-graphite cells with 1.0 M LiPF6 EC+DEC+DMC (1:1:1 vol%) + 0.01 M LiOCH$_3$ electrolyte.

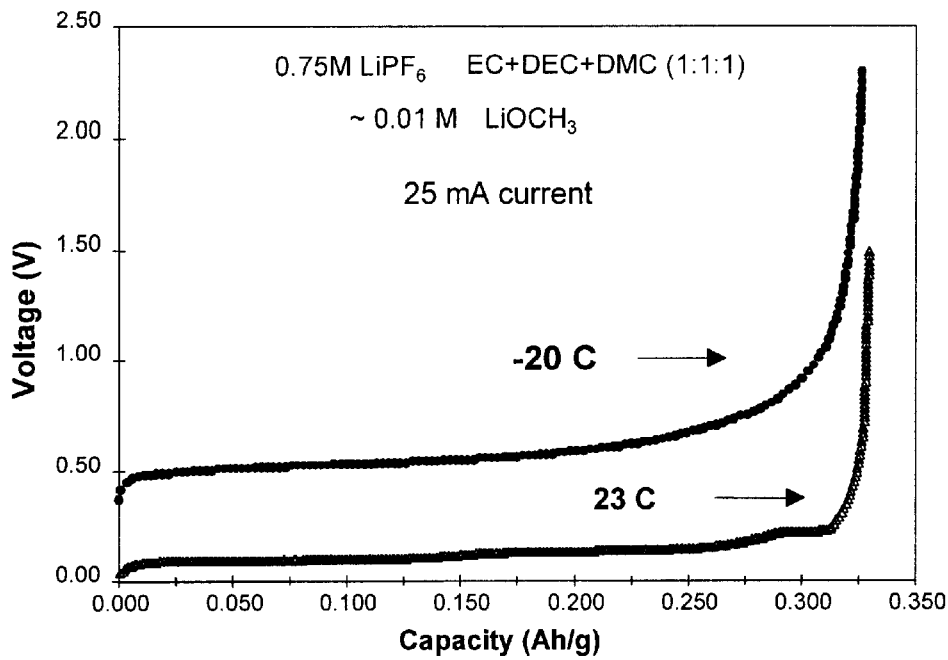
Fig. 26. Discharge curves of graphite electrode in contact with 1.0 M LiPF6 EC+DEC+DMC (1:1:1 vol%) + 0.01 M LiOCH$_3$ electrolyte at different temperatures ( 25 and -20°C).
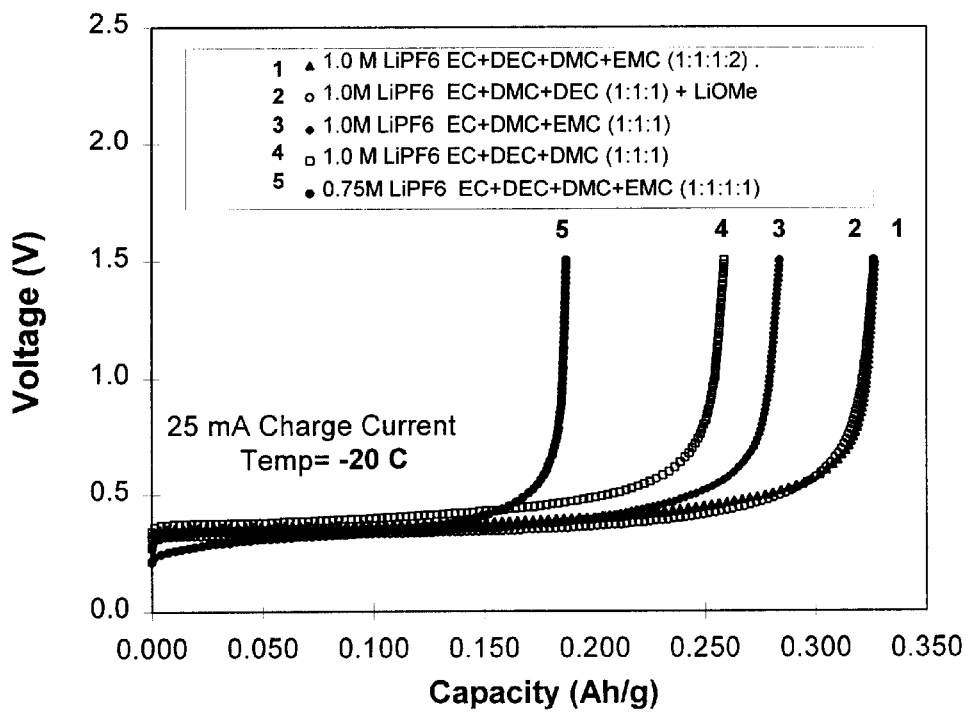
Fig. 27 Discharge curves of graphite electrodes in different electrolytes in different electrolytes at low temperature (-20°C).

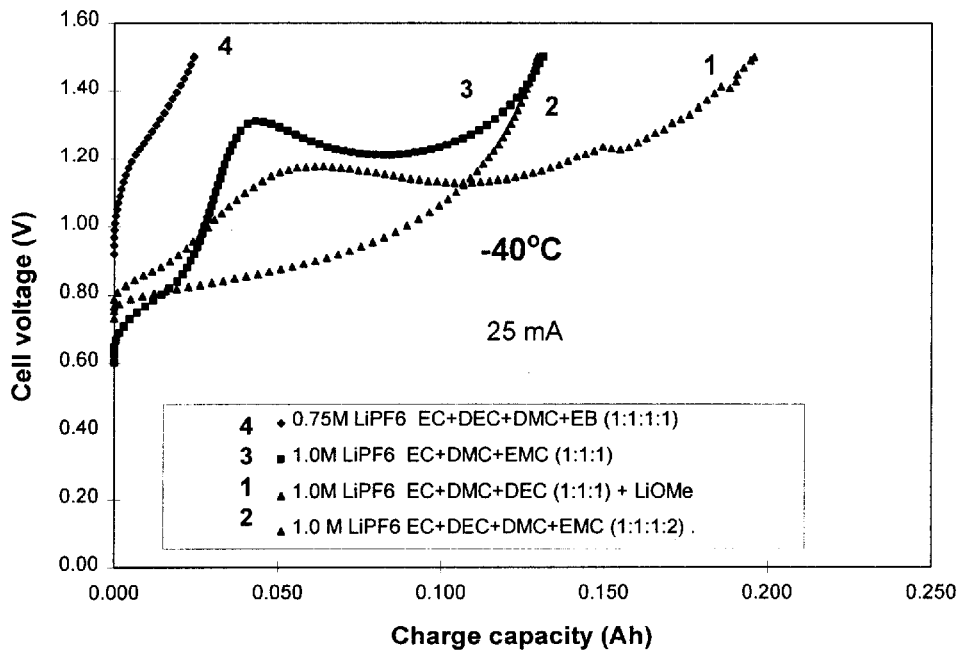
Fig. 28. Discharge curves of graphite electrodes in contact with different electrolytes at low temperature (-40°C).
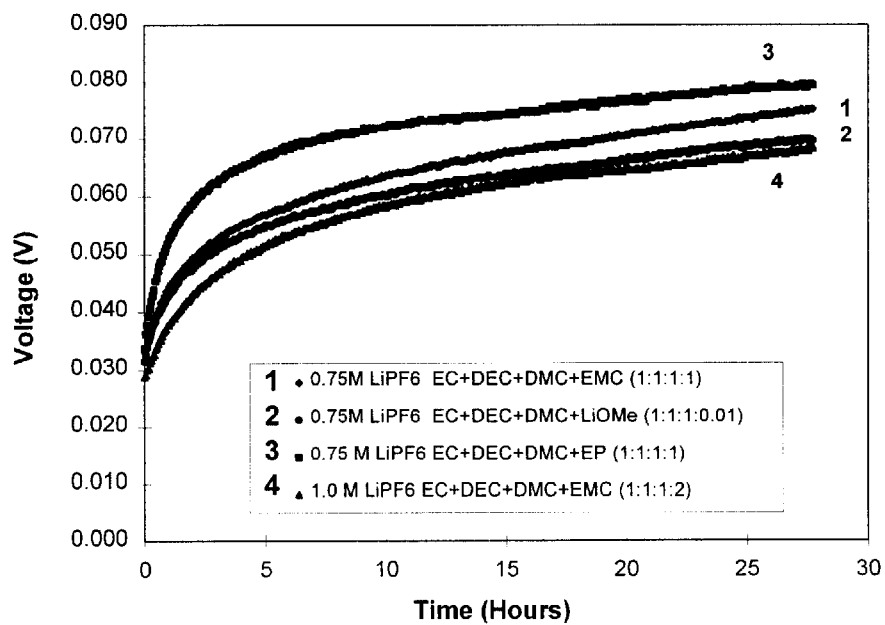
Fig. 29. Self-discharge characteristics (capacity retention) of graphite electrodes in different electrolytes.

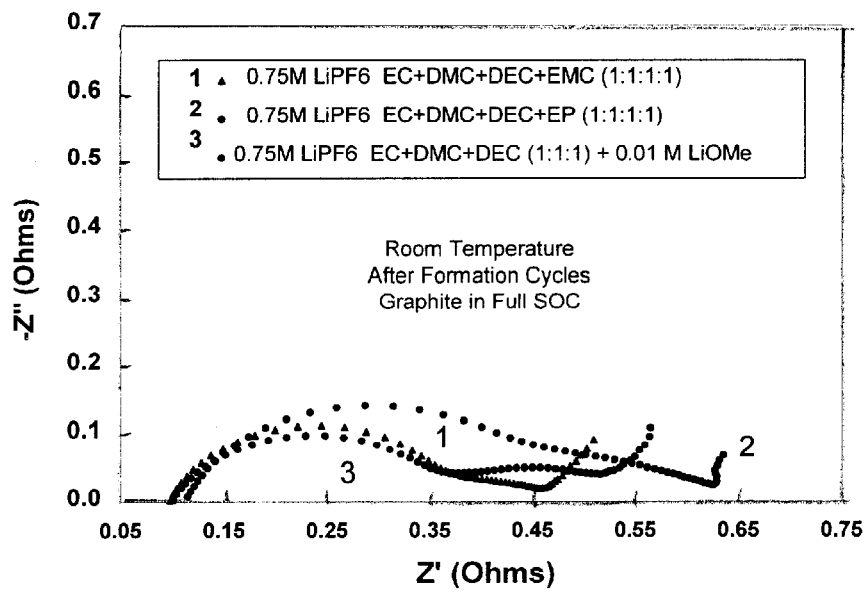
FIG. 30. AC impedance (Nyquist) plots of lithium-graphite cells possessing various electrolytes at 23°C.
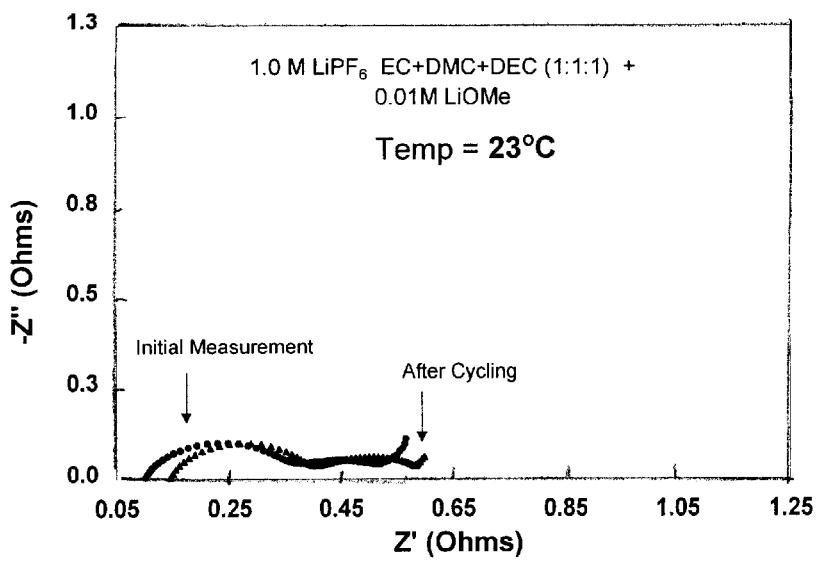
FIG. 31 AC impedance (Nyquist) plots of a lithium-graphite cell containing 1.0 M $LiPF_6$ EC+DEC+DMC (1:1:1 vol%) + 0.01 M $LiOCH_3$ electrolyte.

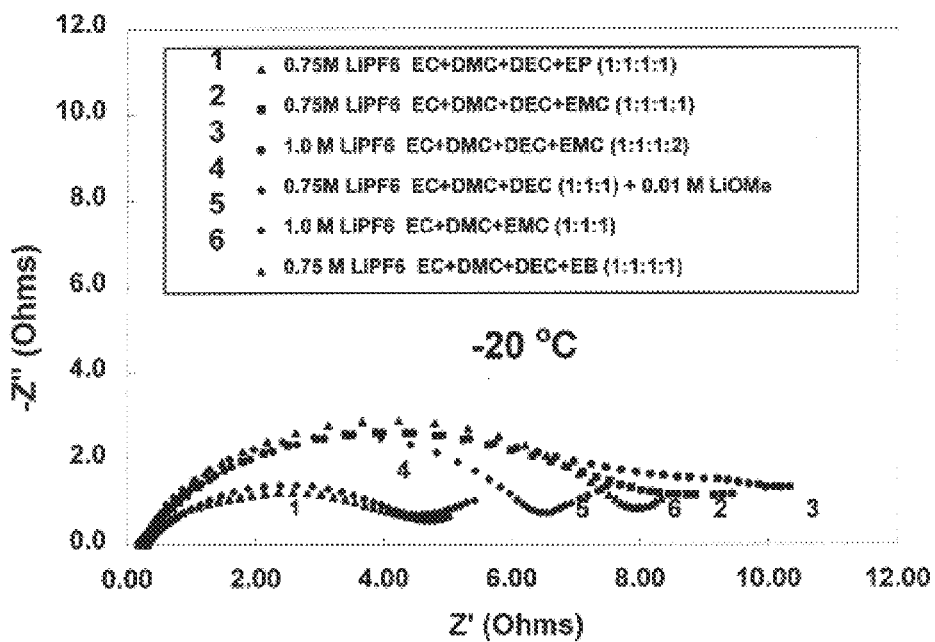
FIG. 32. AC impedance (Nyquist) plots of lithium-graphite cells possessing various electrolytes at low temperature (-20°C).
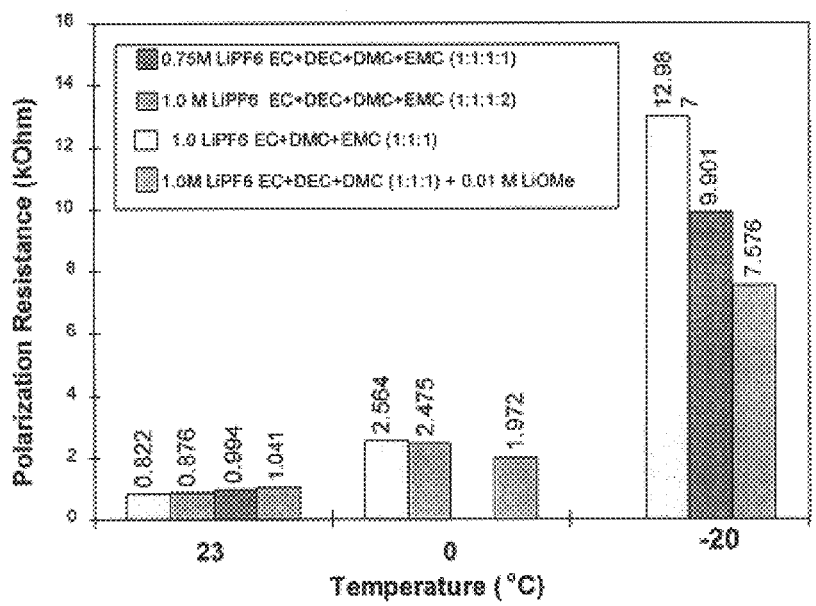
FIG. 33 Linear polarization resistance of graphite electrodes with different electrolytes at various temperatures.

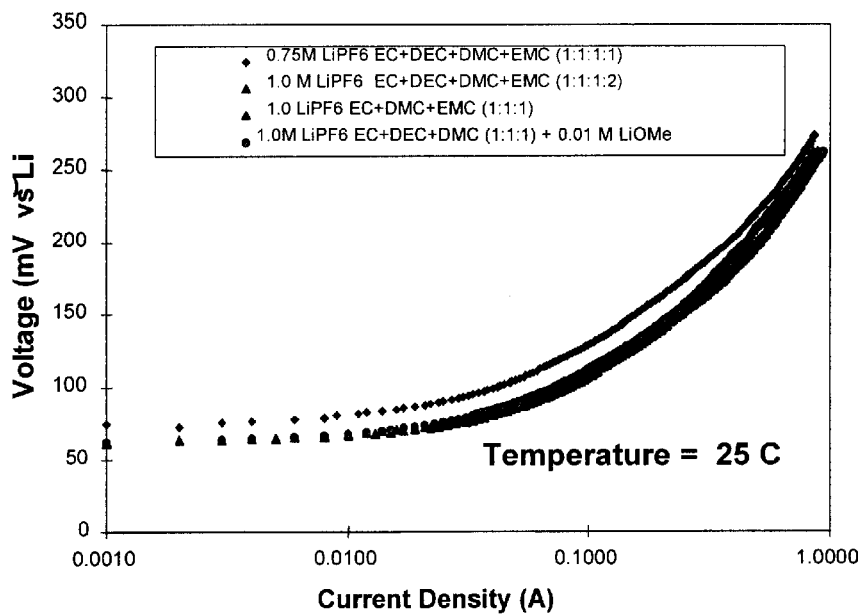
FIG. 34 Tafel polarization plots of graphite electrodes with different electrolytes at room temperature.
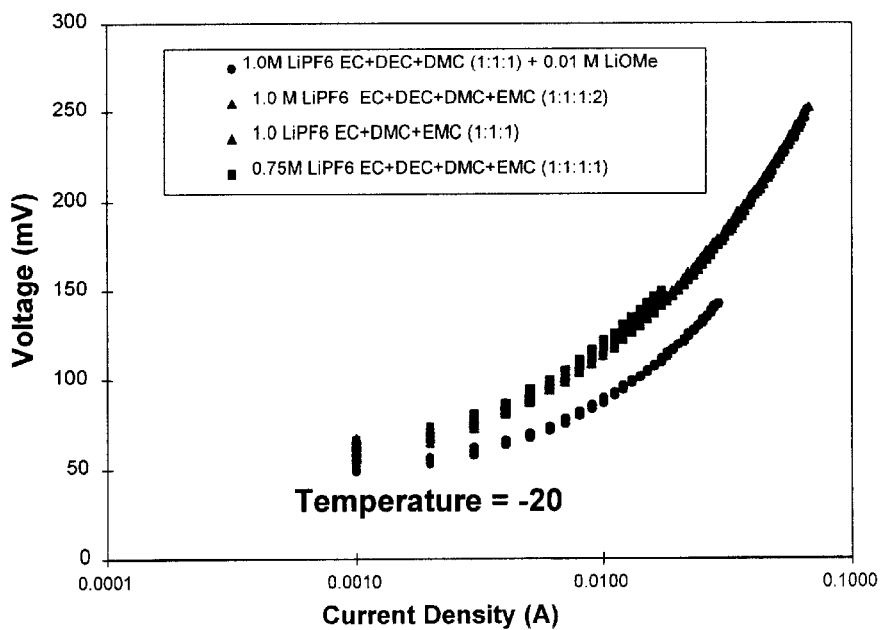
FIG. 35 Tafel polarization plots of graphite electrodes with different electrolytes at low temperature (-20°C).

ORGANIC SOLVENTS, ELECTROLYTES, AND LITHIUM ION CELLS WITH GOOD LOW TEMPERATURE PERFORMANCE

CROSS-REFERENCE TO RELATED APPLICATION

This application claims priority of U.S. Provisional Application Serial No. 60/088,125 filed, June 4, 1998, the contents of which are fully incorporated herein.

ORIGIN OF INVENTION

The invention described herein was made in the performance of work under a NASA contract, and is subject to the provisions of Public Law 96-517 (35 USC 202) in which the Contractor has elected to retain title.

FIELD OF THE INVENTION

The present invention is directed to organic solvents and electrolytes for electrochemical cells, particularly lithium ion cells, and to electrochemical cells exhibiting good low temperature performance.

BACKGROUND OF THE INVENTION

State-of-the-art lithium ion cells typically include a carbon (e.g., coke or graphite) anode intercalated with lithium ions to form $Li_xC$; an electrolyte consisting of a lithium salt dissolved in one or more organic solvents; and a cathode made of an electrochemically active material, typically an insertion compound, such as $LiCoO_2$. During cell discharge, lithium ions pass from the carbon anode, through the electrolyte to the cathode, where the ions are taken up with the simultaneous release of electrical energy. During cell recharge, lithium ions are transferred back to the anode, where they reintercalate into the carbon matrix.

Lithium ion rechargeable batteries have the demonstrated characteristics of high energy density, high voltage, and excellent cycle life, making them more attractive than competing systems such as Ni—Cd and Ni—$H_2$ batteries. However, few state-of-the-art lithium ion cells perform well at low temperatures making them unsuitable for many terrestrial and extra-terrestrial applications. Many scheduled NASA missions demand good low temperature battery performance—without sacrificing such properties as light weight, high specific energy, long cycle life, and moderate cost. The Mars Exploration Program, for example, requires rechargeable batteries capable of delivering 300 cycles with high specific energy, and the ability to operate over a broad range of temperatures, including the extremely low temperatures encountered on and beneath the surface of Mars. Mars Rovers and Landers require batteries that can operate at temperatures as low as −40° C. Mars Penetrators, which will penetrate deep into the Martian surface, require operation at temperatures lower than −60° C.

To be used on the Mars missions and in low earth orbit (LEO) and geostationary earth orbit (GEO) satellites, as well as in terrestrial applications, lithium ion rechargeable batteries should exhibit high specific energy (60–80 Wh/Kg) and long cycle life (e.g., <500 cycles).

Unfortunately, state-of-the-art lithium ion cells typically exhibit poor capacities below 0° C. This is primarily due to limitations of the electrolyte solutions, which become very viscous and freeze at low temperatures, resulting in poor ionic conductivity. In addition, the surface film (i.e., solid electrolyte interphase, SEI) that forms on the electrodes either builds up over the course of repeated charge/discharge cycling or becomes highly resistive at lower temperatures. Ideally, the SEI layer on the carbon anode needs to be protective toward electrolyte reduction and yet conductive to lithium ions to facilitate lithium ion intercalation, even at low temperature.

A number of factors can influence the low temperature performance of lithium ion cells, including (a) the physical properties of the electrolyte (i.e., conductivity, melting point, viscosity, etc.), (b) the electrode type, (c) the nature of the SEI layers that can form on the electrode surfaces, (d) cell design, (e) electrode thickness, separator porosity and separator wetting properties. Of these, the electrolyte properties have the predominant impact upon low temperature performance, as sufficient electrolyte conductivity is a necessary condition for good performance at low temperatures. Ideally, a good low temperature performance electrolyte should possess a combination of several critical properties, including high dielectric constant, low viscosity, adequate Lewis acid-base coordination behavior, as well as appropriate liquid ranges and salt solubilities in the medium.

Conventional electrolytes employed in state-of-the-art lithium ion cells have typically consisted of binary mixtures of organic solvents, for example high proportions of ethylene carbonate, propylene carbonate or dimethyl carbonate, within which is dispersed a lithium salt, such as $LiPF_6$. Examples include 1.0M $LiPF_6$ in a 50:50 mixture of ethylene carbonate/dimethyl carbonate, or ethylene carbonate/diethyl carbonate. Such electrolytes do not perform well at low temperature because they become highly viscous and/or freeze.

It can be seen, therefore, that a clear need exists for improved organic solvents, electrolytes, and electrochemical cells capable of performing well at low and moderate temperatures, with high specific energy and high cycle lives.

SUMMARY OF THE INVENTION

The present invention provides novel organic solvent systems, electrolytes, and electrochemical cells characterized by improved low temperature performance, including high conductivity, good cycle life, good discharge characteristics, good stability and self-discharge characteristics, and excellent compatibility with the cell components, as well as excellent room temperature and elevated temperature performance. Lithium ion cells containing the new electrolytes are ideal for use in portable electronic products, space vehicles, and other applications.

In one embodiment of the invention, an organic solvent system comprises a ternary mixture of ethylene carbonate (EC), dimethyl carbonate (DMC), and diethyl carbonate (DEC), preferably an equal volume mixture of each. Fluorinated analogs—especially perfluorinated analogs—can be used in place of one or more of the solvents.

In a second embodiment of the invention, an organic solvent system comprises a mixture of organic carbonates and at least one aliphatic ester, preferably an alkyl or fluoroalkyl ester. Thus, ternary, quaternary, and higher solvent systems are provided. One such solvent system comprises a ternary mixture of EC, DMC, and MA (methyl acetate). Another solvent system comprises a quaternary or higher mixture of EC, DMC, DEC and at least one alkyl or fluoroalkyl ester.

In still another embodiment, an improved organic solvent system includes two or more alkyl carbonates, preferably EC, DMC, DEC, and/or PC (propylene carbonate), and an asymmetric alkyl carbonate.

In yet another embodiment, the solvent system includes a compound having the formula LiOX (where X is —R, —COOR, or —COR, where R is alkyl or fluoroalkyl) or another basic species that can effectively catalyze the described disproportionation reactions. Fluorinated (especially perfluorinated) analogs of one or more of the co-solvents or additives can also be used. Where the organic solvent system includes an asymmetric alkyl carbonate, such as ethyl methyl carbonate, it can be added directly to the solvent system or generated in situ by including a lithium alkoxide or similar basic species in the mixture. Thus, the present invention also provides a method for making organic solvent systems for electrochemical cells in which asymmetric alkyl carbonates can be produced.

The addition of lithium methoxide or a related basic species also has the observed benefit of improving the SEI formation characteristics of carbonate-based (and other) electrolytes, which contributes to improved cell performance, especially at low temperature, due to low electrode polarization behavior. Lithium methoxide has previously been detected as a by-product formed from electrolyte reactions in lithium-ion cells which have been cycled or exposed to lithiated graphite. In fact, the addition of alkoxides and related basic compounds to lithium ion cell electrolytes has now been found to have a beneficial effect, irrespective of whether the additive(s) can facilitate disporportionation/exchange reactions resulting in asymmetric carbonate formation. The present invention, therefore, includes a method of making an improved electrolyte by adding to an electrolyte solvent system a small amount of a compound of the formula LiOX (as described herein), or a similar basic species.

In addition to novel organic solvent systems, the invention also provides a variety of improved electrolytes, comprising a lithium salt having high ionic mobility, dispersed in an organic solvent system. A preferred salt is $LiPF_6$. The electrolytes are particularly well-suited for use in lithium ion cells, especially where low temperature performance is required.

In another embodiment of the invention, an improved, reversible electrochemical cell comprises an anode, a cathode, and an electrolyte as described herein. Preferably, the anode and cathode are of the insertion type, i.e., a coke, graphite, or modified carbon anode intercalated with lithium ions, and the cathode is a lithiated metal oxide, such as $LiCoO_2$, or a similar material. In operation of the cell, lithium ions pass from the carbon through the electrolyte to the cathode, where they are taken up. During recharge, lithium ions are transferred back to the anode, where they reintercalate into the carbon matrix.

Lithium ion cells prepared in accordance with this invention have high specific energy, energy density, operating voltage, and coulombic efficiency, and low self-discharge tendencies. Cell performance at low temperatures (<−20° C.) is notably improved over comparable, state-of-the-art systems. When used in upcoming space missions, the invention promises the additional benefits of improved reliability, and broader operating range.

DESCRIPTION OF THE DRAWINGS

These and other features and advantages of the invention will be better understood by reference to the following detailed description when considered in conjunction with the accompanying drawings, wherein:

FIGS. 2–35 are graphs comparing various performance characteristics of cells containing prior art electrolytes and cells containing improved electrolytes according to the present invention.

DETAILED DESCRIPTION OF THE INVENTION

Figure 1:
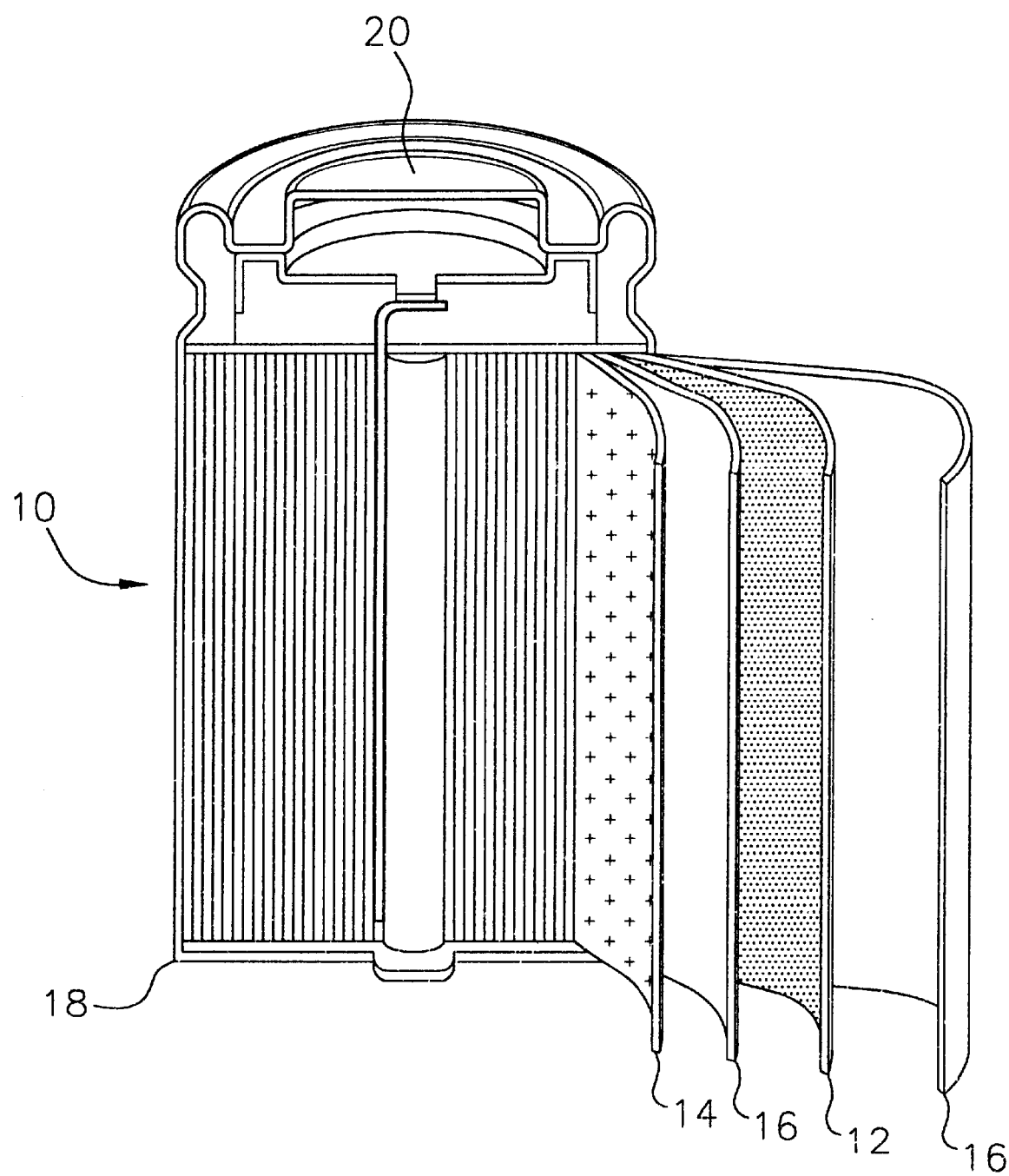
FIG. 1 is a schematic, partially exploded view of an electrochemical cell constructed according to one embodiment of the present invention.

In designing electrolytes that are highly conductive at low temperatures, it is necessary to consider a number of important parameters, such as the dielectric constant of the medium, electrolyte viscosity, Lewis acid-base coordination behavior, and the appropriate solvent freezing points and melting points, and solubilities of the electrolyte salt. To be a viable candidate of lithium-ion cell applications, the electrolyte solution must satisfy a number of requirements in addition to good conductivity over the specified temperature range, namely, (i) good electrochemical stability over a wide voltage window (e.g, 0 to 4.5V), (ii) the ability to form thin, stable passivating films at the carbonaceous anode electrode, and (iii) good thermal and chemical stability. The physical properties of a number of organic carbonates employed in lithium ion cells are shown in Table 1.

TABLE 1

| Abbr. | Organic Carbonate | Viscosity $\eta$ (cP, 25° C.) | Dielectric Constant $\epsilon$ (25° C.) | Donor Number $D_N$ | M.W. | Melting Point (° C.) | Boiling Point (° C.) | Density (g/ml) |
|---|---|---|---|---|---|---|---|---|
| EC | Ethylene Carbonate (1,3-dioxolane-2-one) | 1.85 (40° C.) | 89.6 (40° C.) | 16.4 | 88.06 | 39 | 243 | 1.321 |
| PC | Propylene Carbonate (1,2-propanediol cyclic carbonate) | 2.53 | 64.4 | 15.1 | 102.09 | −55 | 240 | 1.189 |
| DMC | Dimethyl Carbonate | 0.59 | 3.12 | NA | 90.08 | 3 | 90 | 1.069 |
| DEC | Diethyl Carbonate | 0.75 | 2.82 | NA | 118.13 | −43 | 126 | 0.975 |
| DPC | Dipropyl Carbonate | NA | NA | NA | 146.19 | NA | 147 | 0.944 |
| EMC | Ethyl Methyl Carbonate | 0.66 | 2.4 | NA | 104.12 | −14 | 107 | 1.007 |
| MPC | Methyl Propyl Carbonate | 0.9 (19° C.) | NA | NA | 118.13 | −49 | 130 | 0.980 |
| EPC | Ethyl Propyl Carbonate | 0.9 (19° C.) | NA | NA | 132.16 | −81 | 148 | 0.950 |

NA = Not Available

It has now been found that a mixture of organic carbonates, and in some embodiments, other additives, leads to improved low temperature conductivity and increased compatibility of the electrolyte with the electrochemical cell. Organic solvent systems and electrolytes based on a ternary or quaternary mixtures of organic carbonates and other additives have been found to exhibit good low temperature performance and cycle life when used in a lithium ion electrochemical cell. Thus, in one embodiment of the invention, an improved organic solvent system comprises a mixture of ethylene carbonate, dimethyl carbonate, and diethyl carbonate, preferably in a 1:1:1 equal volume mixture. (Unless otherwise noted, the solvent systems disclosed herein are described on a volume-by-volume (v/v) basis.) Organic carbonates such as ethylene carbonate, dimethyl carbonate, and diethyl carbonate are available from Aldrich Chemical company, Inc.(Milwaukee, Wis.), and Mitsubishi Chemical Corporation (U.S. distributor, NY, N.Y.).

Particularly good results are seen with Particularly good results are seen with the (1:1:1 v/v) ternary formulation, which improves the low temperature performance of lithium-ion cells. This stems from a number of factors, including the use of a mixed solvent system, low EC content (<50% by volume) necessary for high conductivity at low temperatures, and a sufficient amount of each of DMC (for low viscosity and high stability/compatibility), DEC (for low melting characteristics), and EC (for effective passivation of electrodes and high temperature stability).

Electrolytes that exhibit good low temperature performance in electrochemical cells are readily prepared from such ternary systems by dissolving therein a lithium salt having high ionic mobility. Non-limiting examples of such salts include $LiPF_6$, $LiAsF_6$, $LiSbF_6$, $LiClO_4$, $LiCF_3SO_3$ and other perfluoroalkyl or -aryl sulfonates, $LiCF_3CO_2$, $LiBF_4$, lithium closo-boranes (i.e., $LiB_{10}Cl_{10}$, $LiB_{12}C_{12}$), lithium organoborates (i.e.,$LiB(CH_3)_4$, $LiB(C_6H_5)_4$, etc.) and perfluorinated alkyl or aryl borates, lithium bis (trifluoromethylsulfonyl)imide, and lithium tris (trifluoromethylsulfonyl) methide. Preferred lithium salts are those possessing a number of characteristics, including thermal, chemical, and electrochemical stability, high solubility in dipolar aprotic solvents, high conductivity over a range of temperatures, and compatibility with cell components. Ideally, the salt should be non-toxic and low cost. $LiPF_6$ is preferred. $LiPF_6$ and many other lithium salts are available from Aldrich, Mitsubishi, and other vendors.

Although the optimum salt concentration depends on several factors, including the effect on melting point, viscosity, conductivity, and solubility, in general, good ternary and quaternary solvent electrolytes exhibiting good low temperature performance can be prepared with lithium salt concentrations ranging from about 0.5 to 1.5M, more preferably, about 0.75 to 1.25M. For obvious reasons, the solvents and electrolytes should be anhydrous.

In addition to investigating low viscosity additives, we have studied the effect of salt type and salt concentration upon the conductivity of electrolyte solutions at low temperature. It was determined that an electrolyte solution consisting of 0.75M $LiPF_6$ in EC+DEC+DMC (1:1:1) showed an improvement in conductivity at temperatures below −20° C., as compared to 1.0M $LiPF_6$ in EC+DEC+DMC (1:1:1). In addition, the electrolyte formulation 0.5M $LiPF_6$ in EC+DEC+DMC+MA (1:1:1:1) displayed better conductivity at temperatures below −40° C., as compared to the 1.0M $LiPF_6$ in EC+DEC+DMC+MA (1:1:1:1) solution. This electrolyte solution should be ideal for ultra-low temperature applications, due to the fact that the conductivity was observed to be greater than 1 mS/cm at −60° C. Although not bound by theory, the improvement in low temperature conductivity observed as the salt concentration decreases is understood to be primarily due to viscosity effects, which increase with increasing salt concentration. Thus, the benefit of lowering the freezing point of a mixture by using higher salt concentrations (freezing point depression effect) must be weighed accordingly with the prohibitive viscosity increase that results in some cases. Ultimately, the range of operating temperatures of a given application will dictate the appropriate salt concentration selection.

In another embodiment of the invention, ternary, quaternary and higher organic solvent systems and electrolytes for low temperature lithium ion cells comprise a mixture of carbonates and at least one aliphatic ester, preferably an alkyl ester with general formula R' COOR", where R' and R" are, independently, $C_1$–$C_{10}$ aliphatic, especially $C_1$–$C_{10}$ alkyl, including branched, straight chain, and cycloaliphatic. Fluorinated aliphatic analogs are acceptable alternatives. In one embodiment, an improved electrolyte solvent system comprises a mixture of ethylene carbonate, dimethyl carbonate, diethyl carbonate and one or more aliphatic esters, preferably an equal volume (1:1:1:1) mixture. Improved electrolytes are made with such systems by dissolving therein a lithium salt, for example, $LiPF_6$.

Quaternary solvent systems can be tailored to have lower viscosity and freezing points then the ternary alkyl carbonate mixture, yet, due to the presence of the alkyl carbonate components, provide desirable film formation characteristics. Improved low temperature conductivity through reduced viscosity and freezing points is provided by the quaternary additive, i.e., the alkyl ester. In fact, quaternary mixtures appear to be more desirable for low temperature lithium ion cells, due to the fact that the electrolyte properties (i.e., dielectric constant, viscosity, liquid range, coordination properties, and overall stability) can be more easily tailored in multi-component systems. In addition, mixed solvent systems appear to produce more highly conductive solutions at low temperatures, as compared to single solvent systems, due to a disordering effect in the lithium ion coordination behavior of the solvent medium.

A number of aliphatic esters are commercially available from Aldrich Chemical Company including, without limitation, esters such as methyl formate (MF), ethyl formate (EF), propyl formate (PF), propyl butyrate (PB), methyl acetate (MA) (m.p.=−98° C., b.p.=57.5° C.), ethyl acetate (EA), propyl acetate (PA), butyl acetate (BA) (m.p.=−78° C.), methyl propionate ($C_2H_5CO_2CH_3$) (m.p.=−88° C., b.p.=79° C.), ethyl propionate ($C_2H_5CO_2C_2H_5$), propyl propionate ($C_2H_5CO_2C_3H_7$) (m.p.=−76° C.), butyl propionate ($C_2H_5CO_2C_4H_9$), methyl butyrate ($C_3H_7CO_2CH_3$) (b.p.=102° C.) ethyl butyrate ($C_3H_7CO_2C_2H_5$), propyl butyrate ($C_3H_7CO_2C_3H_7$), butyl butyrate ($C_3H_7CO_2C_4H_9$) (b.p.=165° C.), methyl valerate ($C_4H_9CO_2CH_3$) (b.p.=128° C.), ethyl valerate ($C_4H_9CO_2CH_3$) (b.p.=144° C.), ethyl heptanoate ($C_6H_{13}CO_2C_2H_5$) (m.p.=−66° C., b.p.=188–189° C.), methyl enanthate (b.p.=172° C.), ($C_6H_{13}CO_2CH_3$), pentyl propionate ($C_2H_5CO_2C_5H_{11}$) (b.p.=169° C.),hexyl acetate ($CH_3CO_2C_6H_{13}$), (m.p.=p−80° C., b.p.=168–170° C.), methyl caproate ($C_5H_{11}CO_2CH_3$) (m.p.=−71° C., b.p.=151° C.), methyl caprylate ($C_7H_{15}CO_2CH_3$) (b.p.=194° C.), amyl acetate ($CH_3CO_2C_5H_{11}$) m.p.=−100° C., b.p.=149° C.), ethyl isovalerate (($CH_3$)$_2CHCH_2CO_2C_2H_5$) (m.p.=−99° C., b.p.=131° C.), ethyl caproate($C_5H_{11}CO_2C_2H_5$) (b.p.=168° C.), ethyl caprylate ($C_7H_{15}CO_2C_2H_5$) (m.p.=−47° C., b.p.=206–208° C.), ethyl caprate($C_9H_{19}CO_2C_2H_5$) (b.p.=245°

C.), neopenyl pivalate ((CH₃)₃CCO₂CH₂C(CH₃)₃) (b.p.= 165° C.), methyl nonaoate (methyl perlargonate) (C₈H₁₇CO₂CH₃) (b.p.=213–214° C.), octyl acetate (CH₃CO₂C₈H₁₇), (b.p.=211° C.), ethyl nonanoate (C₈H₁₇CO₂C₂H₅), methyl decanoate (C₉H₁₉CO₂CH₃), methyl undecanoate (C₁₀H₂₁CO₂CH₃), and dodecyl acetate (CH₃CO₂C₁₂H₂₅) (b.p.=150° C./15 mm). The physicochemical properties of a few of these solvents are listed in Table 2.

TABLE 2

| Abbr. | Alkyl Ester | M.W. | Melting Point (° C.) | Boiling Point (° C.) | Density (g/ml) | Viscosity η (cP) |
|---|---|---|---|---|---|---|
| MF | Methyl Formate | 60.05 | −100° | 34° | 0.974 | 0.325 (25° C.) |
| EF | Ethyl Formate | 74.08 | −80° | 53° | 0.917 | 0.402 (20° C.) |
| MA | Methyl Acetate | 74.08 | −98° | 57.5° | 0.932 | 0.381 (20° C.) |
| EA | Ethyl Acetate | 88.11 | −84° | 77° | 0.902 | 0.455 (20° C.) |
| MP | Methyl Propionate | 88.11 | −88° | 79° | 0.915 | 0.431 (25° C.) |
| EP | Ethyl Propionate | 102.13 | −73° | 99° | 0.892 | 0.564 (15° C.) |
| MB | Methyl Butyrate | 102.13 | −85° | 102° | 0.896 | 0.541 (25° C. |
| EB | Ethyl Butyrate | 116.16 | −101° | 121° | 0.879 | 0.711 (15° C.) |

Aliphatic esters possess low freezing points (i.e., about −70 to −100° C.) and viscosities, and are fully miscible in organic carbonate systems. High molecular weight esters have the advantage of high boiling points (>150° C.) and low melting points, and are ideal for applications where good high temperature and low temperature performance are required.

In one embodiment of this aspect of the invention, a quaternary mixture of organic solvents comprises an equal volume (1:1:1:1) mixture of ethyl carbonate, diethyl carbonate, dimethyl carbonate and one or more aliphatic ester, (preferably ethyl propionate or ethyl butyrate). More generally, the amount of quaternary additive (i.e., the ester) can range from about 5 to 50%, on a volume percent basis. Thus, in addition to 1:1:1:1 mixtures, other representative formulations include EC+DEC+DMC+EB (1:1:1:2) and EC+DEC+DMC+EB (1:1:1:3).

Comparative studies between quaternary formulations differing only in their selection of aliphatic ester display a conductivity trend that favors the low molecular weight esters over the higher molecular weight esters. However, the interfacial stability with the graphite electrode during cell charge-discharge cycling appears to be adversely affected such that the kinetics of lithium intercalation are more severely hindered with the low molecular weight esters, as compared with the higher molecular weight esters, which exhibit adequate interfacial stability and enhanced electrolyte conductivity, resulting in improved low temperature performance for lithium ion rechargeable cells. Consequently, quaternary organic solvent systems containing ethyl butyrate or ethyl propionate are preferred over those containing methyl or ethyl acetate.

Electrolytes based on the quaternary organic solvent systems are readily prepared by mixing a lithium salt, preferably LiPF₆, with the organic carbonates and aliphatic ester(s).

In another embodiment of the invention, an asymmetric carbonate, for example ethyl methyl carbonate (EMC) or methyl propyl carbonate (MPC), is used to prepare ternary or quaternary organic solvent systems and electrolytes. Ethyl methyl carbonate has previously been reported to be a viable solvent for lithium ion battery electrolytes based on binary and ternary solvent formulations. It has now been found that quaternary formulations containing ethyl methyl carbonate are a substantial improvement over binary and ternary EMC-containing electrolytes. Although not bound by theory, it is believed that such quaternary systems provide higher conductivity due to disordered coordination complexes that form therein. Also, the selected quaternary solvent exhibits improved low temperature conductivity, due to its lower freezing point and viscosity.

Ethyl methyl carbonate is available from FMC Corporation (Chicago, Ill.). It can also be generated in situ by adding a small (essentially, catalytic) amount of lithium methoxide or ethoxide to a mixture of dimethyl carbonate and diethyl carbonate. Methyl propyl carbonate can be generated in situ by adding a small amount of lithium methoxide to a mixture of dimethyl carbonate and dipropyl carbonate. A particularly preferred quaternary system based on an asymmetric alkyl carbonate comprises a 1:1:1:1 volume mixture of ethylene carbonate, dimethyl carbonate, diethyl carbonate, and ethyl methyl carbonate. Addition of LiPF₆ or another suitable lithium salt, preferably in a concentration of from about 0.5 to 1.5M, results in an improved electrolyte that exhibits good low temperature performance and other properties required of lithium ion cells.

In another aspect of the invention, ternary, quaternary or higher organic solvent systems and electrolytes are provided, and contain a small amount of an additive, namely, a lithium compound of the formula LiOX, where X is R, COOR, or COR, where R is alkyl, fluoroalkyl, or perfluoroalkyl, or a similar basic species. The LiOX additive is a strong base, and is believed to facilitate the formation of an SEI having desirable characteristics and minimize the deleterious effects of acid-promoted degradation, such as the undesirable action of hydrogen fluoride produced during cell operation. In addition to having favorable SEI film formation characteristics, lithium alkoxides and similar bases can be used to initiate base-catalyzed carbonate exchange reactions in mixtures of symmetrical carbonates, yielding mixtures containing asymmetric carbonates. The following examples are representative:

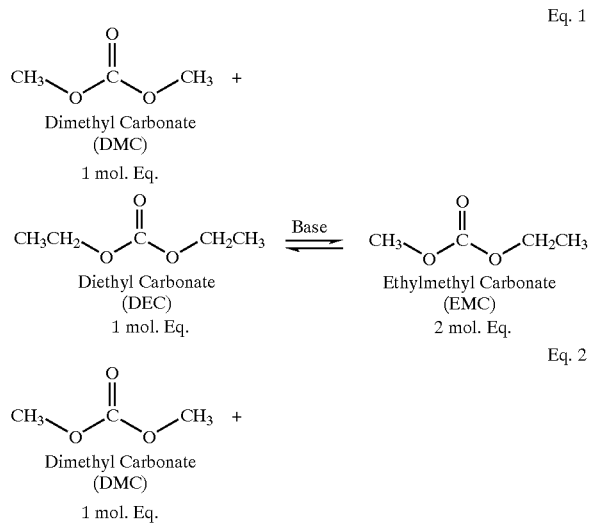

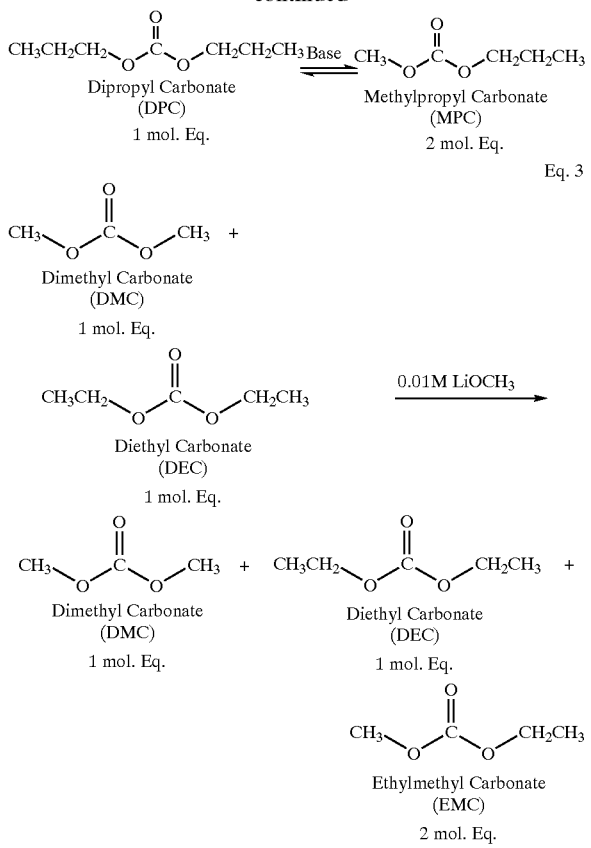

Other examples of asymmetric carbonates include methylpropyl carbonate, butylmethyl carbonate, ethylpropyl carbonate, and butylethyl carbonate, where propyl can be either n-propyl or iso-propyl and butyl can be either n-butyl, i-butyl, or t-butyl.

It will be appreciated that compounds of the formula LiOR are lithium alkoxides. Non-limiting examples include lithium methoxide, lithium ethoxide, lithium iso-propoxide, ,and lithium butoxide, all of which are available from Aldrich Chemical Company. Compounds of the formula LiOCOOR are lithium alkoxy esters. Similar compounds, such as lithium acetoacetate (Aldrich) are also acceptable. Compounds of the formula LiOCOR are lithium carboxylates. A non-limiting example is lithium acetate, available from Aldrich. Fluorinated analogs, including perfluorinated compounds of the formula LiOX (where X is as described above) include such compounds as lithium trifluoroacetate (Aldrich.) Other basic species include aromatic compounds, such as lithium phenoxide, lithium benzoate, and lithium cyclohexanebutyrate (each available from Aldrich); lithium diisopropylamide (LDA) and lithium dimethylamide (Aldrich); lithium metaborate; lithium trimethylsilanolate; and alkyl or aryl lithiums, for example butyl lithium, hexyl lithium, and methyl lithium (Aldrich).

Compositions containing a lithium compound of the formula LiOX (or a similar basic species) are made by adding a small amount of the compound to the organic solvent mixture or electrolyte. Preferred compositions have an LiOX concentration of about 0.0001M to 0.1M, more preferably about 0.01M.

From the preceeding comments, it will be appreciated that another aspect of the invention is a method of improving electrolyte performance (making an improved electrolyte), particularly carbonate-, ether-, and ester-based electrolytes. Thus, an improved electrolyte is made by adding to the solvent mixture, or salt+solvent mixture, a small amount of a basic species, preferably a compound of the formula LiOX, where X is as described above. Other basic compounds (exemplified above) can be used in the alternative.

In another aspect of the invention, the organic solvents and electrolytes described herein are used in the construction of an improved electrochemical cell, characterized by good low temperature performance. Essentially, the cell comprises an anode, a cathode, and an electrolyte. Particularly preferred are lithium ion cells, one embodiment of which is schematically illustrated in FIG. 1. The cell 10 has a carbonaceous anode 12 separated from an insertion-type cathode 14 by one or more electrolyte-permeable separators 16, with the anode/separator(s)/cathode cylindrically rolled up in "jelly roll" fashion and inserted into a can or case 18, which is sealed or closed by a cap 20. Both the anode and the cathode are bathed in an electrolyte (not shown) as described above, which is able to pass through the separator (s), allowing ion movement from one electrode to the other. Other features, such as one or more gaskets, anode tabs, safety vents, center pin, and other features known in the art can be included as deemed appropriate, in accordance with well known battery design and fabrication practice.

Carbon is the preferred anode material for lithium ion rechargeable cells due to its low potential versus lithium (of the lithiated compound), excellent reversibility for lithium intercalation/deintercalation reactions, good electronic conductivity, and low cost. Three broad types of carbonaceous anodic materials are known: (a) non-graphitic carbon, i.e., petroleum coke, pitch coke (b) graphitic carbon, i.e., natural graphite, synthetic graphite, and (c) modified carbon, i.e., meso-carbon micro-bead (MCMB) carbon material. A preferred anodic material is KS-44, a synthetic graphite available from Lonza AG (Basel, Switzerland).

Suitable cathode materials include transition metal oxides, especially insertion type metal oxides. Nonlimiting examples include lithiated cobalt oxides (i.e., $LiCoO_2$), lithiated nickel oxides (i.e., $LiNiO_2$), lithiated manganese oxides (i.e., $LiMn_2O_4$), lithiated vanadium oxides (i.e., $LiV_3O_8$), and lithiated mixed metal oxides (i.e., $LiCo_xNi_{1-x}O_2$). In lithium ion cells, the cathode functions as a source of lithium for the intercalation/deintercalation reactions at the anode and the cathode, because of the instability of carbon materials in the lithiated state. Also, the cathode material in lithium ion cells must have a high voltage versus lithium (>3.0V) to compensate for voltage losses due to the use of alternate lithium anode materials (having reduced lithium activity) such as lithiated carbon. Consequently, lithium transition metal oxides are preferred over binary transition metal chalcogenides. The presently preferred intercalation compounds meeting these requirements are $LiCoO_2$, $LiNiO_2$, $LiMnO_2$, $LiM_2O_4$ and $Li_2V_6O_{13}$. Lithiated cobalt oxide ($LiCoO_2$) is the preferred material because of its ease of preparation and reversibility. Lithiated nickel oxide and lithiated manganese oxide are good alternatives.

In order to achieve long life in lithium ion cells, a case-negative design is preferred. Case-neutral designs are also acceptable. Case-positive design is not preferable in view of the unstable behavior of nickel-plated mild steel/stainless steel materials at higher voltages.

As compared to conventional cells (such as Ni—Cd, Ni—MH, Ag—Zn, Pb-acid), lithium ion cells generally require very thin electrodes, typically in the range of 5–10 mils, to achieve a high charge/discharge rate capability to offset the poor lithium ion defusion characteristics of these electrode materials.

To prevent contact between the anode and cathode, each electrode is preferably wrapped in a separator comprising a microporous polypropylene or polyethylene material, for example Cellguard 2500, manufactured by Celanese Corp. (Charlotte, N.C.). Because of cell resistance considerations, inter-electrode distances should be about 2 mil or less to achieve high rate capability. The preferred thickness of the separator is about 1 mil. Other factors to be considered in selecting the separator material are separator porosity, electrolyte wetting properties, and mechanical properties.

Copper foil is the preferred anode current collector material because of its low cost and high electronic conductivity. Nickel foil can also be considered as an anode current collector. Aluminum foil is the preferred cathode current collector material because of its stability at high voltages (>4.0V) and low cost.

It will be appreciated that a variety of design modifications can be made to the cell without departing from the present invention. For example, the cell need not be cylindrical, but can be prismatic, with rectangular electrodes stacked in alternating fashion. The overall size of the cell is variable; AA up to D-size cells have been prepared in accordance with the present invention.

Examples and Electrochemical Measurements

To evaluate the electrochemical properties of various embodiments of the invention, a series of electrolytes based on ternary and quaternary solvent systems were prepared and tested in half-cell and/or reversible lithium ion cells. For comparative purposes, a series of electrolytes based on binary solvent systems, i.e., ethylene carbonate+dimethyl carbonate, ethylene carbonate+diethyl carbonate, propylene carbonate (PC)+diethyl carbonate, and propylene carbonate+dimethoxyethane (DME), was also prepared. Battery-grade purity organic carbonates, containing the desired concentration of $LiPF_6$ salt, were purchased from Mitsubishi Chemicals, and were certified to contain <50 ppm $H_2O$ content. Alkyl esters were obtained from Aldrich Chemical Company. Lithium methoxide was purchased from Aldrich Chemical Company and used as received. Table 3 summarizes the examples (denoted "Ex.") and comparative samples (denoted "C.Ex."). Solvent amounts are expressed on a relative amount by volume basis, e.g., 1:1:1, 1:1:1:2, etc. Salt concentration is expressed in units of molarity. In some cases, and as indicated in the notes, graphite-type anodes were used, while in other cases coke-type anodes were used.

Some samples were evaluated in 150–300 mAh experimental half-cell studies using O-ring-sealed, glass cells equipped with a "jelly roll" carbon electrode (KS-44 graphite from Lonza) as the cathode and lithium metal as the anode, and a lithium metal reference electrode. Electrochemical measurements were made using an EG&G Potentiostat/Galvanostat (and Solartron 1255 Frequency Response Analyzer for impedance) measurements interfaced with an IBM PC, using Softcorr 352 (and M388 for impedance) software. Cycling data were collected using an Arbin battery test system.

TABLE 3

| Sample | [$LiOCH_3$] | Solvent System | Solvent Ratio |
|---|---|---|---|
| C. Ex. 1 | 1.0 | EC + DMC | (3:7) |
| C. Ex. 2 | 1.0 | EC + DEC | (3:7) |
| C. Ex. 3 | 1.0 | PC + DEC | (1:1) |
| C. Ex. 4 | 0.5 | PC + DEC | (2.5:7.5) |
| C. Ex. 5 | 0.5 | PC + DME | (1:1) |
| C. Ex. 6 | 0.75 | EC + DMC | (3:7) |
| C. Ex. 7 | 0.75 | EC + DMC | (3:7) |
| C. Ex. 8 | 1.0 | EC + DMC + EMC | (1:1:1) |
| Ex. 1 | 1.0 | EC + DEC + DMC | (1:1:1) |
| Ex. 2 | 1.0 | EC + DEC + DMC + MA | (1:1:1:1) |
| Ex. 3 | 1.0 | EC + DEC + DMC + EA | (1:1:1:1) |
| Ex. 4 | 1.0 | EC + DEC + DMC + EP | (1:1:1:1) |
| Ex. 5 | 1.0 | EC + DEC + DMC + EB | (1:1:1:1) |
| Ex. 6 | 0.75 | EC + DEC + DMC + MA | (1:1:1:1) |
| Ex. 7 | 0.75 | EC + DEC + DMC + EA | (1:1:1:1) |
| Ex. 8 | 0.75 | EC + DEC + DMC + EP | (1:1:1:1) |
| Ex. 9 | 0.75 | EC + DEC + DMC + EB | (1:1:1:1) |
| Ex. 10 | 0.75 | EC + DEC + DMC | (1:1:1) |
| Ex. 11 | 0.75 | EC + DEC + DMC + EMC | (1:1:1:1) |
| Ex. 12 | 1.0 | EC + DEC + DMC + EMC | (1:1:1:2) |
| Ex. 13 | 1.0 | EC + DEC + DMC + 0.01 M $LiOCH_3$ | (1:1:1) |

Ternary Solvent Systems

After evaluating the low temperature conductivity and assessing the relative stability of potential systems, a number of electrolytes were selected for evaluation in lithium-ion experimental cells. The low temperature and cycle life performance of these cells was the basis for selecting six electrolytes for incorporation into prototype cells which were fabricated by Wilson Greatbatch Ltd. according to JPL design and possessing electrolytes and electrode materials prepared at JPL. The electrolytes chosen for integration into the prototype cells consist of three ethylene carbonate-based solutions for use with graphite-type anodes: 1.0 M $LiPF_6$ in EC+DMC (30:70), 1.0 M $LiPF_6$ in EC+DEC (30:70), and 1.0 M $LiPF_6$ in EC+DEC+DMC (1:1:1), and three propylene carbonate-based electrolytes for use with coke-type anodes: 1.0 M $LiPF_6$ in PC+DEC (50:50), 0.5 M $LiPF_6$ in PC+DEC (25:75), and 0.5 M $LiPF_6$ in PC+DME (50:50). Although a number of electrolyte solutions which consist of ternary and quaternary mixtures of carbonates with low viscosity additives were investigated and observed to have higher low temperature conductivity, the systems solely based on carbonate mixtures were evaluated at the prototype cell level due to the superior room temperature cycle life and stability.

Electrolyte Conductivity

High EC or DMC content in electrolyte solutions generally results in poor low temperature conductivity due to their high melting points and viscosities. Low temperature conductivity can be improved by substituting these solvents with carbonates of lower melting points, such as PC or DEC, or by the addition of a third component which can serve as a low viscosity additive. For example, electrolytes composed of EC+DEC and EC+DEC+DMC both display higher conductivity at lower temperature due to the use of DEC which has a lower melting point and a lower viscosity, as shown in Table 4. It is evident that, as between the binary and ternary EC-based electrolytes, the electrolyte consisting of 1.0 M $LiPF_6$ in EC+DEC+DMC (1:1:1) displayed the highest conductivity at temperatures of −20° C. and lower. The improved conductivity of the ternary system over the binary electrolytes at low temperatures is due to the synergistic effect of having EC (which has good coordinating ability and a high dielectric constant), DEC (which acts to lower the melting point of the medium), and DMC (which helps to lower the viscosity of the system) present in the proper proportions. Good conductivity of the ternary system is also a result of the fact that the lithium coordination complexes formed therein are more disordered, allowing higher ionic mobility.

relate well with the conductivity trend: EC+DEC+DMC >EC+DEC >EC+DMC. A significant aspect of these measurements is that both the charge and discharge were performed at low temperature, in contrast to charging at ambient conditions and only discharging at low temperature.

TABLE 4

| | Electrolyte | | | Conductivity (mS/cm) | | | | |
|---|---|---|---|---|---|---|---|---|
| Sample | Concentration | Solvent System | | −60° | −40° | −20° C. | 0° C. | R.T |
| C. Ex. 1 | 1.0 M LiPF$_6$ | EC + DMC | (30:70) | | Fr. | 1.9 | 7.1 | 12.2 |
| C. Ex. 2 | 1.0 M LiPF$_6$ | EC + DEC | (30:70) | Fr. | 0.66 | 1.9 | 4.0 | 7.5 |
| Ex. 1 | 1.0 M LipF$_6$ | EC + DEC + DMC | (1:1:1) | 0.02 | 1.01 | 2.9 | 5.6 | 9.7 |
| C. Ex. 4 | 0.5 M LiPF$_6$ | PC + DEC | (25:75) | 0.28 | 0.97 | 2.1 | 3.7 | 5.7 |
| C. Ex. 3 | 1.0 M LiPF$_6$ | PC + DEC | (50:50) | 0.05 | 0.43 | 1.6 | 3.6 | 6.6 |
| C. Ex. 5 | 0.5 M LiPF$_6$ | PC + DME | (50:50) | 0.67 | 2.3 | 4.6 | 7.6 | 12.5 |

Nature of Electrolyte Interaction with Graphite Anode Electrodes

A number of cells were fabricated with EC-based electrolytes and evaluated in terms of the reversible and irreversible capacity upon cycling. As illustrated in Table 5, the cells containing electrolytes consisting of 1.0M LiPF$_6$ in EC+DMC (3:7) display the lowest irreversible capacities of the series studied, whereas the cells with 1.0M LiPF$_6$ in EC+DEC (3:7) displayed the highest irreversible capacities. This trend suggests that DMC has inherently greater stability compared with DEC when placed in contact with lithiated carbon. As expected, cells containing an electrolyte consisting of 1.0M LiPF$_6$ in EC+DEC+DMC (1:1:1) displayed irreversible capacity values that are intermediary between the EC+DEC and EC+DMC-based cells. The data suggests that cells containing EC+DMC-based electrolytes display the least amount of electrolyte decomposition when in contact with graphite anodes under charging conditions and therefore possess superior surface films. In contrast, the cells containing the 1.0M LiPF$_6$ in EC+DEC (3:7) electrolyte display properties indicative or greater electrolyte decomposition rates and/or the formation of surface films without the desirable passivating qualities. As expected, the cells containing an electrolyte consisting of 1.0M LiPF$_6$ in EC+DEC+DMC (1:1:1) displayed behavior consistent with the fact that it is a mixture containing both DMC (less reactive) and DEC (more reactive).

TABLE 5

| Sample | Cell | Electrolyte Type (All Contain 1.0 M LiPF$_6$) | | Reversible Capacity (mAh/g) | Irreversible Capacity (mAh/g) |
|---|---|---|---|---|---|
| Ex. 1 | A | EC + DMC + DEC | (1:1:1) | 235.36 | 82.16 |
| Ex. 1 | B | EC + DMC + DEC | (1:1:1) | 217.97 | 72.30 |
| C. Ex. 2 | C | EC + DEC | (30:70) | 200.73 | 111.90 |
| C. Ex. 2 | D | EC + DEC | (30:70) | 215.31 | 139.49 |
| C. Ex. 1 | E | EC + DMC | (30:70) | 221.86 | 47.18 |
| C. Ex. 1 | F | EC + DMC | (30:70) | 261.57 | 48.91 |

Discharge Capacity at Different Rates and Temperatures

A number of cells were fabricated with each electrolyte and evaluated in terms of the discharge characteristics and rate capability as a function of temperature. A comparison of the low temperature discharge performance of graphite-based cells at −20° C., (FIGS. 2 and 3), shows that the cells containing the electrolyte 1.0 M LiPF$_6$ in EC+DEC+DMC (1:1:1) delivered the highest capacity at −20° C., corresponding to over 85% of the room temperature capacity. The discharge characteristics observed for cells at −20° C. cor- From the experimental results, it is evident that the incorporation of DEC into the solvents mixtures can greatly improve the low temperature performance compared to the state-of-the-art EC+DMC-based electrolyte systems.

The discharge capacities of the cells were evaluated over a temperature range of −40° to 23° C. and at a number of different charge and discharge rates. As shown in FIG. 4, the discharge capacity of a cell containing 1.0 M LiPF$_6$ in EC+DEC+DMC (1:1:1) electrolyte was evaluated over a large temperature range and was observed to deliver ~60% of the room temperature capacity at −30° C. at ~C/20 rate. Graphite-based prototype cells containing this ternary electrolyte displayed the best low temperature performance of the ternary EC-based systems studied.

As expected, the rate capability of the cells decreased with decreasing temperature. However, as illustrated in FIG. 5, a cell containing 1.0M LiPF$_6$ in EC+DEC+DMC (1:1:1) and discharged at a rate of ~C/5 at −20° C. was still capable of delivering 70% of the capacity displayed at a C/20 rate.

When the discharge capacities of both the coke-type and graphite-type design prototype cells were evaluated at −30° C. under the same rate conditions (FIG. 6), the cell containing 1.0M LiPF$_6$ in EC+DMC+DEC (1:1:1) out-performed all other ternary systems dramatically. The high capacity of this system is attributed to the high conductivity of the electrolyte at low temperature and the inherently high capacity of graphite compared to coke-based systems.

The delivered discharge capacity can be increased greatly at low temperatures if low rates are used and the discharge cut-off voltage is lowered below 3.0V. As shown in FIG. 7, when the discharge cut-off voltage of a cell containing 1.0M LiPF$_6$ in EC+DMC+DEC (1:1:1) at −40° C. is lowered to 2.5V and the discharge rate decreased from 25 mA to 10 mA, the discharge capacity is increased by a factor of three to four, corresponding to approximately one fourth of the room temperature capacity at −40° C. Although it has been suggested that continued discharge to low voltage may promote cell degradation mechanisms, the processes are likely to be less significant at lower temperatures due to change in electrode potential as a function of temperature and slower reaction kinetics.

When the cells were evaluated at extremely low temperatures (−58° C.), at very low rates (C/70 to C/150), and discharged to 2.0V, the cell containing 1.0M LiPF$_6$ in EC+DMC+DEC (1:1:1) electrolyte was observed to deliver >460 mah capacity, which corresponds to >90% of the room temperature capacity, as shown in FIG. 8.

Cycle Life Performance

In addition to evaluating the rate performance as a function of temperature, the cycle life performance was assessed at both room temperature and at −20° C. Although the primary focus of the Mars Exploration Program is to develop a rechargeable battery capable of operation at low temperature, room temperature cycling tests were deemed necessary to demonstrate the requisite stability during storage, launch, cruise or during daylight hours on Mars. The room temperature cycling tests of a number of cells are currently in progress, and the graphite-based AA size cells have completed >500 cycles to date, as shown in FIG. 9. The results demonstrate that the cells containing 1.0 M LiPF$_6$ in EC+DMC+DEC (1:1:1) electrolyte have excellent room temperature cycle life with minimal capacity fade rate and high capacity.

Of the ternary organic solvent systems tested, the best low temperature cycle life observed with graphite-based anodes was seen with 1.0M LiPF$_6$ in EC+DMC+DEC (1:1:1) electrolyte, which initially delivered >84% of the room temperature capacity at −20° C. and displayed >75 Wh/Kg at a C/10 rate, as shown in FIG. 10. The cells containing 1.0M LiPF$_6$ in EC+DMC (30:70) and 1.0M LiPF$_6$ in EC+DEC (30:70) both showed inferior behavior with lower capacities and higher capacity fade rates.

Self-Discharge Characteristics

In order to determine the relative stability of the electrolyte solutions evaluated, the self-discharge behavior of prototype lithium-ion cells was investigated. As a general observation, lithium-ion cells having electrolyte systems that produce poor passivating films on the electrode surfaces, or that participate in degradation mechanisms readily, often exhibit high discharge rates. As illustrated in FIG. 11, the cells containing the EC-based electrolytes and graphite-based anodes displayed the smallest self-discharge rates, as evident from the cell voltage on OCV stand. When the EC-based electrolyte are compared, the electrolyte consisting of 1.0M LiPF$_6$ in EC+DMC+DEC (1:1:1) displayed a charge retention behavior comparable to that of the EC+DMC electrolyte, which is widely used due to its proven stability.

After the prototype lithium-ion cells were placed in prolonged storage for approximately six months at 0° C. in the fully charged state, they were placed on charge to determine how much capacity had been lost due to self-discharge mechanisms. As shown in FIG. 12, electrolyte-filled cells equipped with a graphite anode displayed the following trend expressed in greatest resistance to self-discharge: 1.0M LiPF, in EC+DMC (30:70)>1.0M LiPF$_6$ in EC+DMC+DEC (1:1:1)>1.0M LiPF$_6$ in EC+DEC (30:70). These results suggest that the DMC-based electrolytes solutions display more favorable film formation characteristics and/or degradative reactivity.

Solvent Systems Containing Alkyl Esters

Detailed studies related to the surface film formation, low temperature performance and interfacial stability have been carried out to determine the beneficial effects of ester additives to carbonate-based electrolytes in general and EC+DMC+DEC systems in particular.

Electrolyte Conductivity Measurements

A number of carbonate-based electrolytes containing low viscosity, low melting aliphatic ester additives were prepared and the conductivity measured over a temperature range of −60° C. to 25° C. The electrolytes assessed consisted of baseline formulations, 1.0M LiPF$_6$ in EC+DEC+DMC (1:1:1), to which the low viscosity co-solvents were added, including: methyl acetate (MA), ethyl acetate (EA), ethyl propionate (EP), and ethyl butyrate (EB).

Of the electrolytes investigated, the formulations that displayed the highest conductivity at low temperatures (FIG. 13) were ones containing the lower molecular weight acetates and displayed the following trend: 1.0M LiPF$_6$ EC +DEC +DMC +MA (1:1:1)>1.0M LiPF$_6$ EC+DEC+DMC+ EA (1:1:1:1) >1.0M LiPF$_6$ EC+DEC+DMC+EP (1:1:1:1) >1.0M LiPF$_6$ EC+DEC+DMC+EB (1:1:1:1).

Lithium-Graphite Half Cell Studies

A number of lithium-graphite (KS 44 graphite) half-cells were fabricated with Li reference electrodes to study the effect of co-solvents upon the film formation characteristics on carbon electrodes (both graphite and MCMB-based materials). One purpose of these efforts was to determine the irreversible and reversible capacities of graphite electrodes in contact with various electrolyte solutions. The lithium-graphite half-cells also serve as an additional screening test to identify the compatibility and stability of candidate electrolytes with carbonaceous electrodes. The electrolytes selected for evaluation included 0.75 M LiPF$_6$ dissolved in (a) EC+DEC+DMC+MA (1:1:1:1), (b) EC+DEC+DMC+ EA (1:1:1:1), (c) EC+DEC+DMC+EP (1:1:1:1), (d) EC+DEC+DMC+EB (1:1:1:1), and (e) EC+DEC+DMC (1:1:1).

Charge/discharge Characteristics of Lithium-graphite Cells

One aspect of studying the charge/discharge characteristics of the lithium metal-carbon half-cells included the assessment of the observed irreversible and reversible capacities as a function of electrolyte type. These results are summarized below in terms of mAh/g of active carbon used. When the group of electrolytes containing acetate additives (MA, EA, EP, EB) are considered, a correlation is observed with the higher molecular weight additives resulting in higher reversible capacities after the fifth formation cycle. This is shown in FIG. 14.

The cells displayed the following trend in increasing reversible capacity: EA (214.2 mAh/g)>MA (236.5 mAh/g) >EB (309.46 mAh/g)>EP (340.75 mAh/g). A similar type of trend was observed for the irreversible capacities, in that the higher molecular weight acetate-based electrolytes also tended to have higher irreversible capacities. These results are summarized in the following table:

TABLE 6

| Sample | Electrolyte-Type (All Contain 0.75 M LiPF$_6$) | | Rev. Cap mAh/g (1st Cycle) | Irr. Cap mAh/g (1st Cycle) | Rev. Cap mAh/g (5th Cycle) | Irr. Cap mAh/g (5th Cycle) |
|---|---|---|---|---|---|---|
| Ex. 10 | EC + DEC + DMC | (1:1:1) | 227.2 | 106.0 | 240.4 | 127.1 |
| Ex. 6 | EC + DEC + DMC + MA | (1:1:1:1) | 201.5 | 36.9 | 236.5 | 56.9 |
| Ex. 7 | EC + DEC + DMC + EA | (1:1:1:1) | 210.4 | 49.9 | 214.2 | 68.5 |
| Ex. 8 | EC + DEC + DMC + EP | (1:1:1:1) | 233.4 | 49.06 | 340.75 | 88.30 |
| Ex. 9 | EC + DEC + DMC + EB | (1:1:1:1) | 272.0 | 55.6 | 309.46 | 90.86 |

The charge/discharge characteristics of these cells was investigated as a function of temperature at varying rates. In general, the cells containing the higher molecular weight acetate (EP and EB)-based electrolytes displayed superior performance at low temperatures compared with the cells containing the lower molecular acetate (MA and EA)-based electrolytes. This is understood as being related to the nature of the surface films formed on the carbon electrodes as the electrolyte type is varied. Although the MA- and EA-containing electrolytes showed low irreversible capacities (which is usually suggestive of an electrolyte with good passivating characteristics) they displayed large polarization and charge transfer resistances (elaborated upon below). Thus, the kinetics of lithium intercalation and de-intercalation are not as facile due to the impervious nature of surface films of the MA- and EA-containing electrolytes in contrast to the EP and EB-containing cells. At −20° C., when the de-intercalation process was studied at a modest rate (25 mA or ~C/12) both the EB- and EP-electrolytes performed well (>2/3 the room temperature capacity), with the EB-containing electrolyte displaying performance superior to that of the baseline 1.0M LiPF$_6$ in EC+DEC+DMC (1:1:1) electrolyte at low temperature. This is shown in FIG. 15.

Electrochemical Characterization of the SEI Layer on Graphite Electrodes and the Effect of Electrolyte Composition In addition to studying the charge/discharge characteristics of these cells, AC impedance was used to probe the nature of the anode passivating film. Measurements were conducted for each cell after the formation process (5 cycles), as well as, after the cells had been subjected to cycling and characterized in terms of the self-discharge behavior. When the group of acetate containing cells is compared in terms of the charge transfer resistance, it was observed that the EB- and EP-containing cells displayed lower values than those observed with the low molecular weight acetate derivatives. This is shown in FIG. 16.

The EB- and EP-containing cells also displayed less of an increase in the $R_B$ and $R_{CT}$ values after cycling, compared with the MA- and EA-containing cells, suggesting that the surface films are more inhibitive against further reaction of the electrolytes with the higher molecular weight additive.

AC impedance measurements were also taken at a number of temperatures (25, 0, −20, and −40° C.) to determine the effect of temperature upon the film resistance of the samples. It was generally observed that the film resistance dramatically increased at low temperatures. These results suggest that the nature of the SEI layer on the carbon electrode plays a large role in determining the low temperature discharge performance in addition to the bulk resistivity of the electrolyte. Among the ester-based electrolytes, the EP- and EB-based electrolytes showed more favorable behavior at −20° C. (FIG. 17) compared with the MA- and EA-based solutions, displaying significantly lower charge transfer resistances.

DC micropolarization techniques were also employed to study the charge transfer behavior of the passivating films on the graphite electrodes at various temperatures. The polarization resistance of the electrodes was calculated from the slopes of the linear plots generated under potentiodynamic conditions at scan rates of 0.02 mV/s (FIG. 18).

With the ester-containing electrolytes, the following trend of increasing polarization resistance is observed at room temperature: EC+DEC+DMC+EB (0.735 kOhms) <EC+DEC+DMC+EP (0.818 kOhms)<EC+DEC+DMC+MA (0.974 kOhms)<EC+DEC+DMC+EA (1.344 kOhms). A somewhat similar trend was also observed when investigated at low temperature (−20° C.): EC+DEC+DMC+EP (6.828 kOhms)<EC+DEC+DMC+EB (11.11 kOhms <EC+DEC+DMC+EA (16.60 kOhms). Thus, the electrolytes with the higher molecular weight ester additives should perform better at low temperature compared with the lower mol. weight ester due to the improved kinetics and smaller polarization values. This trend correlates well with the data obtained from the charge/discharge characterization of the cell at low temperature.

The limiting current densities were also determined for the lithium deintercalation from the graphite electrodes by conducting Tafel polarization measurements to evaluate the rate capability of these electrodes. These measurements were conducted on the lithium-graphite cells at various temperatures (25, 0, −20, and −40° C.). The results obtained correlate well with the DC micro-polarization measurements in that the cells possessing high polarization resistance, i.e. with electrolytes possessing MA or EA, have lower diffusion limiting currents (measured at an over potential of 250 mV) compared with cells containing EP or EB as an electrolyte co-solvent.

Organic carbonate-based electrolytes containing low molecular weight ester additives exhibit higher conductivity at low temperatures than electrolytes containing higher molecular weight ester additives. However, the interfacial stability with graphite during charge-discharge cycling is adversely affected such that the kinetics of lithium intercalation are severely hindered with the low molecular weight ester systems. Electrolytes containing higher molecular weight esters, on the other hand, have adequate interfacial stability and enhanced electrolyte conductivity, both resulting in improved low temperature performance for lithium ion rechargeable cells.

In addition to the previously described cells, prototype AA-size lithium-ion cells have been demonstrated to operate effectively at temperatures as low as −30 to −40° C. The electrolytes chosen for investigation in this series of cells include: 0.75M LiPF$_6$ in EC+DEC+DMC+MA (1:1:1:1:), 0.75M LiPF$_6$ in EC+DEC+DMC+GBL (gamma-butyrolactone) (1:1:1:1), 0.75M LiPF$_6$ in EC+DEC+DMC+EMC (1:1:1:1), 0.75M LiPF$_6$ in EC+DEC+DMC+EA (1:1:1:1), and 0.75M LiPF$_6$ in EC+DMC+MA(1:1:1). When the cells were charged at room temperature and discharged at −40° C. (after approximately a four hour equilibration period), excellent discharge capacity was delivered in some cases. The cell having the ethyl acetate-containing electrolyte was observed to display the best performance, with >140 mAh being delivered at −40° C., which corresponds to greater than 35% of the room temperature capacity. The cell having the 0.75M LiPF$_6$ in EC+DMC+MA (1:1:1) electrolyte also displayed performance superior to that of the baseline electrolyte at −40° C. [1.0M LiPF$_6$ in EC+DEC+DMC (1:1:1)], delivering ~110 mAhr compared to only ~75 mAhr for the baseline. When the cells were evaluated at low rate (10 mA discharge current =C/40) at −40° C., the cell containing the 0.75M LiPF$_6$ in EC+DMC+MA (1:1:1) electrolyte was observed to deliver the highest discharge capacity (~380 mAhr), followed by the cell containing the 0.75M LiPF$_6$ in EC+DEC+DEC+MA (1:1:1:1) electrolyte, both of which were superior to that of the baseline electrolyte.

Asymmetric Carbonate-Based Systems
Lithium-Graphite Half Cell Studies

A number of lithium-graphite cells were fabricated to evaluate the low temperature electrolytes for lithium ion cells. The use of such three electrode half-cells facilitated the study of the effect of different electrolytes upon the film formation characteristics on carbon electrodes (both graphite and MCMB-based materials). One purpose of these efforts was to determine the irreversible and reversible capacities of graphite electrodes in contact with various electrolyte solutions. The lithium-graphite half-cells also serve as an additional screening test to identify the compatibility and stability of candidate electrolytes with carbonaceous electrodes. The following systems were evaluated:

| Sample | Electrolyte | Anode |
|---|---|---|
| Ex. 10 | 0.75 M LiPF$_6$ EC + DEC + DMC (1:1:1:1) | KS-44 Graphite |
| Ex. 11 | 0.75 M LiPF$_6$ EC + DEC + DMC + EMC (1:1:1:1) | KS-44 Graphite |
| Ex. 12 | 1.0 M LiPF$_6$ EC + DEC + DMC + EMC (1:1:1:2) | KS-44 Graphite |
| C. Ex. 8 | 1.0 M LiPF$_6$ EC + DMC + EMC (1:1:1) | KS-44 Graphite |

The selection of these electrolytes is based upon the beneficial properties of adding a low viscosity, low melting point solvent additive (ethyl methyl carbonate) to organic carbonate mixtures that have been observed to have the desirable stability and passivating qualities. Another underlying objective was to minimize the amount of EC used (and maximize EMC content), without impairing salt dissolution, and to extend the operation of these electrolytes to lower temperatures.

Charge/discharge Characteristics of Lithium-graphite Cells

One aspect of studying the charge/discharge characteristics of the lithium metal-carbon half-cells included the assessment of the observed irreversible and reversible capacities as a function of electrolyte type. Table 7 summarizes the results in terms of mAh/g of active carbon used. When the electrolytes containing different proportions of EMC as a co-solvent are compared, generally high reversible capacities (296–336 mAh/g) and low irreversible capacities were observed after the fifth cycle. An attempt to quantify the effect of EMC incorporation in the electrolyte upon the reversible and irreversible capacities is complicated by the effect of varying EC content in these formulations.

EC+DEC+DMC (1:1:1)>0.75M LiPF$_6$ in EC+DEC+DMC+EMC (1:1:1:1). It appears that the electrolyte formulation, 0.75M LiPF$_6$ in EC+DEC+DMC+EMC, can be further improved in terms of low temperature performance by further optimizing the concentration of the salt (from 1.0 to 1.25 M), since increased salt concentration causes a depression in the freezing point of the medium, without any prohibitive increase in the viscosity. In the course of the charge/discharge characterization, it was generally observed that the process of lithiation into carbon is less facile than the de-intercalation process (and is rate limiting), implying that the charge time and rate is crucial to obtain effective performance at low temperature. FIG. 20 shows the formation cycles at room temperatures. In all the cases, the capacity attained plateau values, suggesting the formation of a stable SEI on the anode.

Electrochemical Characterization of the SEI Layer on Graphite Electrodes and the Effect of Electrolyte Composition In addition to studying the charge/discharge characteristics of these cells, AC impedance was used to probe the nature of the anode passivating film. Measurements were conducted for each cell after the formation process (5 cycles), as well as, after the cells had been subjected to cycling and characterized in terms of the self-discharge behavior. FIG. 21 illustrates the impedance behavior of the SEI-covered graphite anodes in different electrolytes at room temperature.

The resistance of the SEI in the EMC-containing solutions is comparable to each other and is less than the ternary mixture. After cycling, the resistance values were closer. AC impedance measurements were also taken at a number of temperatures (25, 0 −20, and −40° C.) to determine the impact of temperature upon the film resistance of the samples. As indicated in FIG. 22, the film resistance increases considerably at low temperatures. These results suggest that the nature of the SEI layer on the carbon electrode plays a large role in determining the low temperature discharge performance in addition to the bulk resistivity of the electrolyte. Nevertheless, the values of SEI resistance are reasonably low in the EMC-containing solutions, even at −40° C.

DC micropolarization techniques were also employed to study the charge transfer behavior of the passivating films on

TABLE 7

| Sample | Electrolyte-Type (A = 0.75 M LiPF$_6$) (B = 1.0 M LiPF$_6$) | Rev. Cap mAh/g (1st Cycle) | Irr. Cap mAh/g (1st Cycle) | Rev. Cap mAh/g (5th Cycle) | Irr. Cap mAh/g (5th Cycle) |
|---|---|---|---|---|---|
| Ex. 10 | A in EC + DEC + DMC (1:1:1) | 227.2 | 106.0 | 240.4 | 127.1 |
| Ex. 6 | A in EC + DEC (30:70) | 266.1 | 106.6 | 275.4 | 136.9 |
| Ex. 7 | A in EC + DMC (30:70) | 302.0 | 94.3 | 312.6 | 122.9 |
| C. Ex. 8 | B in EC + DMC + EMC (1:1:1) | 246.2 | 55.0 | 296.8 | 87.5 |
| Ex. 11 | A in EC + DEC + DMC + EMC (1:1:1:1) | 292.4 | 47.6 | 317.0 | 87.5 |
| Ex. 12 | B in EC + DEC + DMC + EMC (1:1:1:2) | 319.1 | 46.0 | 335.8 | 77.0 |

The charge/discharge characteristics of these cells was investigated as a function of temperature at varying rates. The cells containing 1.00M LiPF$_6$ in EC+DEC+DMC+EMC (1:1:1:2), 1.0M LiPF$_6$ in EC+DMC+EMC (1:1:1) and 0.75M LiPF$_6$ in EC+DEC+DMC+EMC (1:1:1:1) also displayed large discharge capacities at low temperature (FIG. 19).

Cells containing the above-described electrolytes displayed the following trend in low temperature discharge capacity: 1.0M LiPF$_6$ in EC+DEC+DMC+EMC (1:1:1:2) >1.0M LIPF$_6$ in EC+DMC+EMC (1:1:1)>1.0M LiPF$_6$ in the graphite electrodes at various temperatures. The polarization resistance of the electrodes (FIG. 23) was calculated from the slopes of the linear plots generated under potentiodynamic conditions at scan rates of 0.02 mV/s.

The polarization resistance obtained (at room temperature and low temperatures) in the EMC-based solutions is comparable within each solution and with the ternary solution, suggesting that the characteristics of the SEI are similar. In other words, the kinetics for the lithium intercalation being unaltered, the beneficial effects of the EMC additive (on electrolyte conductivity) could be realized. This is further supported by Tafel polarization data in various electrolytes and at various temperatures (25, 0, −20, and −40° C.).

Addition of EMC had no observable adverse effect either on the SEI or on the kinetics.

Alkoxide Additives

Lithium methoxide was identified as an excellent electrolyte additive to facilitate the in-situ ester exchange reaction in carbonate mixtures. To investigate the viability of using lithium alkoxides as electrolyte additives, a solution consisting of 1.0M $LiPF_6$ in EC+DEC+DMC (1:1:1 vol %) and approximately 0.01M $LiOCH_3$ was prepared and allowed to react for approximately two weeks at room temperature. Under these conditions, a solution consisting of 1.0M $LiPF_6$ in EC+DEC+DMC+EMC will be formed due to ester exchange reactions. The most probable composition of the mixture described is EC+DEC+DMC+EMC (42.7:11.7:22.1:23.5 mol %) due to the fact that the initial solution consisted of EC+DEC+DMC (42.7:23.5:33.8 mol %) and was assumed to reach a state of equilibrium. This solution was then added to a lithium-graphite half cell equipped with a reference electrode, and the lithium intercalation/deintercalation behavior in carbon was studied. The electrical performance cell was also evaluated in terms of the stability and low temperature performance.

Charge/discharge Characteristics of Lithium-graphite Cells

The charge/discharge characteristics of a number of cells containing carbonate-based electrolytes was investigated as a function of temperature at varying rates. Prior to these characterization cycles, the cells were cycled five times at room temperature as part of the cell formation process. As illustrated by the first intercalation/de-intercalation cycle of the cell containing the carbonate electrolyte with the lithium alkoxide additive (FIG. 24), high reversible lithium capacity was observed (322 mAh/g carbon) with KS-44 graphite, with small irreversible capacity consumed in the first cycle (59 mAh/g). This reversible capacity is higher than that obtained with the parent electrolyte (0.75M $LiPF_6$ in EC+DEC+DMC (1:1:1) and consistent with the presence of EMC as supported by results obtained with the electrolyte (0.75M $LiPF_6$ in EC+DEC+DMC+EMC (1:1:1:1). There was no diminishment of reversibility observed over the first five formation cycles (an increase to 334 mAh/g reversible capacity was observed), as shown in FIG. 25. In addition, the irreversible capacity was observed to stay constant over the first five cycles, implying that the SEI formation process was essentially complete after the first cycle. This suggests that the nature of the surface films formed on the carbon surface on the first cycle are very favorable and prevent further electrolyte decomposition.

When electrolytes containing different proportions of EMC as a co-solvent were compared, generally high reversible capacities and low irreversible capacities were observed (296–336 mAh/g) after the fifth cycle. An attempt to quantify the effect of EMC incorporation in the electrolyte upon the reversible and irreversible capacities is complicated by the effect of varying EC content in these formulations. However, from Table 8 it is evident that the methoxide-containing electrolyte behaved in a similar fashion to that of the EC+DEC+DMC+EMC (1:1:1:2) electrolyte, supporting the view that the incorporation of the electrolyte additive did indeed result in the disproportionation of the starting symmetric carbonates. A significant result from these comparisons is that the methoxide-containing electrolyte resulted in the cell with the least amount of irreversible capacity loss and nearly the highest reversible capacity obtained.

TABLE 8

| Sample | Electrolyte-Type (A = 0.75 M $LiPF_6$) (B = 1.0 M $LiPF_6$) | Rev. Cap (1st Cycle) | Irr. Cap (1st Cycle) | Rev. Cap (5th Cycle) | Irr. Cap (5th Cycle) |
| --- | --- | --- | --- | --- | --- |
| Ex. 1 | B in EC + DEC + DMC (1:1:1) | 227.2 | 106.0 | 240.4 | 127.1 |
| C. Ex. 1 | B in EC + DMC (30:70) | 302.0 | 94.3 | 312.6 | 122.9 |
| Ex. 11 | A in EC + EC + DMC + EMC (1:1:1:1) | 292.4 | 47.6 | 317.0 | 87.5 |
| Ex. 12 | B in EC + DEC + DMC + EMC (1:1:1:2) | 319.1 | 46.0 | 335.87 | 77.0 |
| C. Ex. 8 | B in EC + DMC + EMC (1:1:1) | 246.22 | 54.97 | 296.76 | 87.51 |
| Ex. 13 | B in EC + DEC + DMC + (1:1:1) + 1.0 M $LiOCH_3$ | 322.4 | 58.5 | 334.1 | 55.8 |

Low Temperature Performance

The charge/discharge characteristics of these cells was investigated under similar conditions as a function of temperature. As shown in FIG. 26, when the methoxide-containing electrolyte was investigated, more than 95% of the room temperature lithium capacity was realized at −20° C. (>300 mAh/g) at a~C/12 rate. This performance is superior to that of the baseline electrolyte, 1.0M $LiPF_6$ IN EC+DEC+DMC (1:1:1), as well as a number of other carbonate mixtures investigated, as shown in FIG. 27. The observed graphite discharge capacity of the 1.0M $LiPF_6$ in EC+DEC+DMC (1:1:1)+$LiOCH_3$ was very similar to the results obtained with the 1.0M $LiPF_6$ in EC+DEC+DMC+ EMC (1:1:1:2) electrolyte. This further supports the contention that the base-catalyzed exchange reaction was allowed to reach equilibrium concentrations, resulting in the introduction of EMC and the formation of a quaternary solvent mixture similar to the one investigated.

In addition to evaluating the cells at −20° C., the discharge capacities of the graphite electrodes was investigated at −40° C. As shown in FIG. 28, the methoxide-containing electrolyte resulted in the highest capacity (room temperature charge) delivering ~150 mAh/g.

Self-Discharge Behavior

A significant portion of the self-discharge in a Li ion cell is believed to occur at the carbon anode, implying that it is a strong function of the nature of the electrolyte solution due to its role of forming protective surface films. Thus, the extent of self-discharge (or extent of capacity retention) can reflect the nature of the SEI film on the carbon electrode. In an attempt to further elucidate the mechanism of self-discharge, the cells containing various carbonate-based electrolytes were fully charged and left under open circuit conditions. By monitoring the cell voltage, some indication of the electrode state of charge can be discerned (although it is difficult to quantify due to the non-linear response). As shown in FIG. 29, the methoxide-containing electrolyte displayed favorable characteristics (small voltage decay)

which was similar to the 1.0M LiPF$_6$ in EC+DEC+DMC+EMC (1:1:1:2) electrolyte.

Electrochemical Characterization of the SEI Layer on Graphite Electrodes and the Effect of Electrolyte Composition In addition to studying the charge/discharge characteristics of these cells, a.c. impedance was used to probe the nature of the anode-passivating film. Measurements were conducted for each cell after the formation process (5 cycles), as well as after the cells had been subjected to cycling and characterized in terms of the self-discharge behavior. As shown in FIG. 30, when the ac impedance measurements were conducted after the formation cycle, the methoxide-containing electrolyte displayed very favorable characteristics, with low series and film resistance being analogous to that of the cell containing the EC+DEC+DMC (1:1:1:1) electrolyte.

The methoxide-containing cell also displayed less of an increase in the RB and RT values after cycling, as shown in FIG. 31, compared with other carbonate-containing cells, suggesting that the surface films are more inhibitive against further reaction of the electrolytes with the incorporation of the additive. This aspect is especially noteworthy since the low temperature performance of lithium ion cells containing various low temperature electrolytes has been observed to degrade with cycling, implying that the SEI layer on the carbon electrode becomes more resistive with prolonged operation. The behavior observed with the incorporation of lithium methoxide suggests that SEI formation is especially complete after the first cycle, and little further electrolyte decomposition occurs preventing the progressive increase in the resistivity of the carbon surface films.

AC impedance measurements were also taken at a number of temperatures (25, 0, −20, and −40° C.) to determine the impact of temperature upon the film resistance of the samples. It was generally observed that the film resistance dramatically increased upon going to lower temperatures. These results suggest that the nature of the SEI layer on the carbon electrode plays a large role in determining the low temperature discharge performance in addition to the bulk resistivity of the electrolyte. When a number of cells containing carbonate-based solutions were compared at −20° C., the cells containing the methoxide additive displayed better performance characteristics than cells containing only the carbonates, including LiPF$_6$ in EC+DMC+EMC (1:1:1), EC+DEC+DMC+EMC (1:1:1:1) and EC+DEC+DMC+EMC (1:1:1:2). This is shown in FIG. 32.

DC micropolarization techniques were also employed to study the charge transfer behavior of the passivating films on the graphite electrodes at various temperatures. The polarization resistance of the electrodes was calculated from the slopes of the linear plots generated under potentiodynamic conditions at scan rates of 0.02 mV/s (FIG. 33). When the carbonate-based electrolytes were compared at room temperature, it was generally observed that, with increasing EMC content, the polarization resistance of the electrode increased, with the methoxide-containing electrolyte exhibiting the greatest polarization: EC+DEC+DMC (1:1:1) (0.760 kOhms)<EC+DEC+DMC+EMC (1:1:1:1) (0.822 kOhms)<EC+DEC+DMC+EMC (1:1:1:2) (0.876 kOhms) <EC+DMC+EMC (1:1:1) (0.994 kOhms)<EC+DMC+EMC (1:1:1)+LiOMe (1.014 kOhms). A different trend was observed, however, when the cells were evaluated at −20° C., with the methoxide-containing electrolyte displaying the lowest amount of polarization when contrasted with the other electrolytes: EC+DMC+EMC (1:1:1)+LiOMe (7.576 kOhms)<EC+DEC+DMC (7.876 kOhms)<EC+DMC+EMC (1:1:1) (9.90 kOhms)<EC+DEC+DMC+EMC (1:1:1:2) (12.99 kOhms)<EC+DMC+DEC+EMC (1:1:1:1) (13.16 kOhms). These results suggest that the methoxide- containing electrolyte produces carbon filmed electrodes which display facile lithium intercalation/de-intercalation kinetics at low temperature (similar to the favorable characteristics observed with EC+DEC+DMC) while also possessing the more favorable physical properties and high reversible capacities associated with EMC-containing electrolytes.

The limiting current densities were also determined for the lithium deintercalation process from the graphite electrodes by conducting Tafel polarization measurements to evaluate the rate capability of the electrodes in contact with the various electrolytes. These measurements were conducted on the lithium-graphite cells at various temperatures (25, 0, −20, and −40° C.). When the effect of various carbonate-based electrolyte types upon the polarization characteristics of carbon electrodes are studied at room temperature (FIG. 34), the lithium methoxide- containing electrolyte displayed behavior closely resembling that of the EC+DEC+DMC+EMC (1:1:1:2) electrolyte, being consistent with the in situ formation of EMC. When the cells were evaluated at −20° C. C, (FIG. 35), the electrolyte containing the lithium methoxide additive resulted in the least amount of electrode polarization and the highest limiting current densities, implying facile lithium intercalation/de-intercalation kinetics. These results are consistent with the trend observed when the cells were evaluated using linear polarization techniques, as well as with the cell charge/discharge characteristics at low temperature.

Other Approaches for Improved Low Temperature Performance of Lithium Ion Cells

From the foregoing, it will be appreciated that a number of electrolyte formulations fit within this approach to improving the low temperature performance of lithium ion battery electrolytes. Non-limiting example of such formulations include:

(a) LiPF$_6$ in EC+DEC+DMC (1:1:1 vol %)+LiOCH$_3$, (b) LiPF$_6$ in EC+DEC+DMC (1:1:1 mol %)+0.01 M LiOCH$_3$, (c) LiPF$_6$ in EC+DPC+DMC (1:1:1 mol %)+LiOCH$_3$, (d) LiPF$_6$ in EC+DBC+DMC (1:1:1 mol%)+0.01M LiOCH$_3$, (e) LiPF$_6$ in EC+EMC (1:3)+LiOCH$_3$, (f) LiPF$_6$ in PC+EMC (1:3)+LiOCH$_3$, (g) LiPF$_6$ in PC+DEC+DMC (1:1:1)+LiOCH$_3$, (h) LiPF$_6$ in EC+DEC+DPC+LiOCH$_3$ (i) LiPF$_6$ in EC+DEC+DBC+LiOCH$_3$, (j) LiPF$_6$ in EC+DMC+DEC+DBC, (k) LiPF$_6$ in EC+DPC+DBC+LiOCH$_3$ (l) ester-containing electrolytes (MA, EA, PA, EP, EB, etc.), (m) ester+alkyl carbonate-containing electrolyte mixtures (MA, EA, PA, EP, EB+DEC, DMC, DPC, DBC and EMC), (n) perfluro-ester-containing electrolytes (F-MA, F-EA, F-PA, F-EP, and F-EB), (o) perfluro-ester+alkyl carbonate-containing electrolyte mixtures (F-MA, F-EA, F-PA, F-EP, and F-EB+DEC, DMC, DPC, DBC and EMC), and (p) ester+perfluro-alkyl carbonate-containing electrolyte mixtures (MA, EA, PA, EP, EB+F-DEC, F-DMC, F-DPC, F-DBC and F-EMC). "DBC" is an abbreviation for dibutyl carbonate.

Many permutations of the electrolytes described herein can be used. The amount, concentration, relative proportions, and identity of the solvents and salt can be modified within the broad confines of the inventions. Lithium alkoxides besides broad confines of the inventions. Lithium alkoxides besides lithium methoxide can serve as the reaction catalyst species, including LiOCH$_2$CH$_3$, LiOCH$_2$CH$_2$CH$_3$, LiOCH$_2$CH$_2$CH$_2$CH$_3$, LiOCH(CH$_3$)$_2$, LiOC(CH$_3$)$_3$, LiOCF$_3$, and LiOCF$_2$CF$_3$. LiOCOOR and LiOCOR (where R = —CH$_3$, —CH$_2$CH$_3$, —$CH_2CH_2CH_2CH_3$, —$CH(CH_3)_2$, —$C(CH_3)_3$, —$CF_3$, —$CF_2CF_3$, etc.) are also acceptable.

The beneficial properties of asymmetric carbonates in terms of low temperature performance of lithium-ion electrolytes (low melting point, compatibility with the cell, good film formation characteristics, high lithium reversibility), can be realized with an in-situ formation process based on the use of compounds of the formula LiOX, preferably in catalytic amounts, to mixtures of precursor electrolyte formulations. In addition to possessing desirable physical properties, such as low mp, the multi-component character of the resulting quaternary solution (EC+DEC+DMC+EMC) allows for increasing disorder in the lithium solvent coordination sphere and generally results in higher conducting solutions at low temperature due to the lack of "structuredness".

From lithium-graphite half-cells studies, it was demonstrated that the addition of lithium methoxide to a ternary mixture of carbonates resulting in improved low temperature characteristics. In addition to possessing the desired low temperature characteristics, behaving in a similar fashion to that of the 1.0M $LiPF_6$ in EC+DEC+DMC+EMC (1:1:1:2) electrolyte, the methoxide-containing electrolyte should posses superior high temperature performance in that it possesses a higher EC content (33 vs. 20 vol % EC), which has been observed to result in lower capacity fade during high temperature cycling (25–50° C.).

This invention in its broader aspects is not limited to the specific details shown and described herein. Departures may be made from such details without departing from the principles of the invention and without sacrificing its chief advantages. For example, the improved organic solvent systems and electrolytes described herein are also suitable for use in polymer matrix and gel electrolyte electrochemical cells, including polyvinylidene difluoride, polyacrylonitrile, other acrylic polymers, and other host matrices known in the art.

Throughout the text and the claims, use of the word "about" in relation to a range of numbers is intended to modify both the high and low values recited.

What is claimed is:

1. An organic solvent system for an electrochemical cell, comprising: a 1:1:1 equal volume mixture of ethylene carbonate, dimethyl carbonate, and diethyl carbonate.

2. An electrolyte comprising a lithium salt dispersed in an organic solvent system as recited in claim 1.

3. An electrolyte as recited in claim 2, wherein the lithium salt is $LiPF_6$.

4. An electrolyte as recited in claim 2, wherein the salt is present in a concentration of from about 0.5M to 1.5M.

5. An electrochemical cell, comprising:
   an anode;
   a cathode; and interspersed therebetween an electrolyte comprising a lithium salt dispersed in an organic solvent system as recited in claim 2.

6. An organic solvent system for an electrochemical cell, comprising: a mixture of ethylene carbonate, dimethyl carbonate, diethyl carbonate, and a fluoroalkyl ester.

7. An organic solvent for an electrochemical cell, comprising: a mixture of ethylene carbonate, dimethyl carbonate, diethyl carbonate and a compound of the formula LiOX, where X is R, COOR, or COR, where R is perfluoroalkyl.

8. An organic solvent system for an electrochemical cell, comprising:
   a mixture of ethylene carbonate, dimethyl carbonate, diethyl carbonate, and a compound of the formula LiOR, where R is fluoroalkyl.

9. An organic solvent system as recited in claim 8, wherein R is perfluoroalkyl.

10. An organic solvent system as recited in claim 8, wherein the compound of the formula LiOR is present in a concentration of about 0.0001M to 0.1M.

* * * * *